(12) United States Patent
Tomita

(10) Patent No.: US 7,417,664 B2
(45) Date of Patent: Aug. 26, 2008

(54) STEREOSCOPIC IMAGE PICKING UP AND DISPLAY SYSTEM BASED UPON OPTICAL AXES CROSS-POINT INFORMATION

(76) Inventor: Seijiro Tomita, 13-5, Inogata 3-chome, Komae-shi, Tokyo 201-0015 (JP)

( * ) Notice: Subject to any disclaimer, the term of this patent is extended or adjusted under 35 U.S.C. 154(b) by 829 days.

(21) Appl. No.: 10/475,849

(22) PCT Filed: Mar. 20, 2003

(86) PCT No.: PCT/JP03/03405

§ 371 (c)(1),
(2), (4) Date: Oct. 31, 2003

(87) PCT Pub. No.: WO2004/084560

PCT Pub. Date: Sep. 30, 2004

(65) Prior Publication Data
US 2004/0233275 A1    Nov. 25, 2004

(51) Int. Cl.
*H04N 13/00* (2006.01)
(52) U.S. Cl. .............................. 348/43; 348/47; 348/51
(58) Field of Classification Search .................. 348/43, 348/47, 51; *H04N 13/00*
See application file for complete search history.

(56) References Cited

U.S. PATENT DOCUMENTS 5,937,212 A * 8/1999 Kurahashi et al. ............. 348/47

* cited by examiner

*Primary Examiner*—Young Lee
(74) *Attorney, Agent, or Firm*—Edwards Angell Palmer & Dodge LLP

(57) ABSTRACT

A stereoscopic video image pick-up and display system having a stereoscopic video image pick-up device including two video image pick-ups for outputting video information from the pick-ups; a stereoscopic video image display device for displaying different video images; and a medium for transmitting the video image information from the stereoscopic video image pick-up device to the stereoscopic video image display device. The stereoscopic video image pick-up device includes a cross-point measuring device for measuring CP information on the cross-point (CP) of optical axes of pick-ups and outputs information including the CP information and video image information to the medium. The stereoscopic video image display device includes an offset presetting device for offsetting and displaying different video images based upon the video image information, the cross-point information and information on the size of the image which is displayed by the stereoscopic video image display device.

22 Claims, 15 Drawing Sheets $$Ld : Ld - Ls = \frac{de}{2} : X1 \quad (1)$$

$$Ld : Ld - Ls = \frac{de}{2} : X1 + Xo \qquad (2)$$

FIG.12
(1)
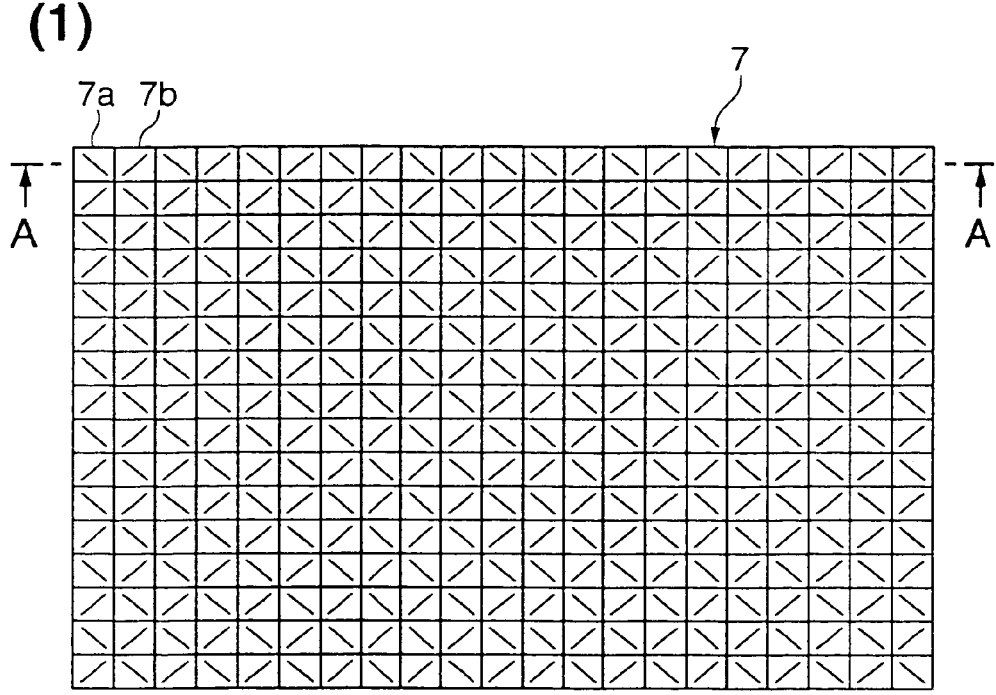
(2)
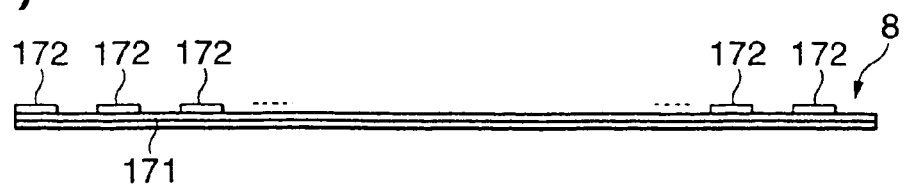

STEREOSCOPIC IMAGE PICKING UP AND DISPLAY SYSTEM BASED UPON OPTICAL AXES CROSS-POINT INFORMATION

BACKGROUND OF THE INVENTION

1. Field of the Invention

The present invention relates to a stereoscopic image pick-up and display system and in particular to a stereoscopic image pick-up and display system which is capable of displaying an appropriate stereoscopic images by changing the stereoscopic degree depending upon the size of a display screen and different stereoscopic image pick-up conditions.

2. Description of the Prior Art

There have heretofore been stereoscopic image pick-up and display systems each comprising a stereoscopic image pick-up device, a stereoscopic image display device which displays the stereoscopic image which has been picked up by the stereoscopic image pick-up device and a medium which are disposed between both devices for transmitting image data and the like.

For example, a stereoscopic image pick-up device which is disclosed in Japanese Published Patent Application JP-A-2001-231055 comprises a image pick-up unit 601 including two CCD cameras 602 and 603 as shown in FIG. 14. Right-eye and left-eye images are picked up by first and second cameras 602, and 603, respectively. At this time, a cross-point (convergence point) CP on the surface of an object (subject) to be picked up S at which optical axes CL1 and CL2 of the first and second cameras 602, and 603, respectively are intersected is formed, so that the stereoscopic images are picked up. A technology has been proposed for determining the distance between the surface of the object and the image pick-up device L (that is, the distance between the pick-up device and CP) based upon the angle of the optical axis and the spacing between two cameras 602 and 603.

Japanese Published Patent Application JP-A-Hei 8-262370 discloses a stereoscopic image display device as shown in FIG. 15, which displays the image which is picked up by the stereoscopic image pick-up device disclosed in the JP-A-2001-231055.

In addition to the stereoscopic display device requiring special glasses, a stereoscopic display device which requires no special glasses and the like has been proposed. In this case, right-eye and left-eye images having a parallax therebetween as stereoscopic information are alternately switched for every image signal (one field) by a liquid crystal device circuit (not shown) and alternate blinking operation of two backlights 705a and 705b is conducted in synchronization with the switched image display on a liquid crystal display unit 704.

When a signal of image for the right-eye is displayed on the liquid crystal display unit 704, one of the backlights 705a is lit in synchronization with an input signal so that light of the backlight is incident upon the right-eye 709a of a viewer (observer). Subsequently, when a signal of the image for the left-eye is displayed on the liquid crystal display unit 704, the other backlight 705b is lit in synchronization with the signal so that light of the backlight is incident upon the left-eye 709b of the viewer. Since one image for right-eye on the liquid crystal display unit can be viewed by only the right-eye of the viewer while one image for left-eye on the liquid crystal display unit can be viewed by only the left-eye of the viewer, both images are merged in the brain of the viewer by the afterimage effect on the retina of the viewer, so that the merged image can be viewed as a stereoscopic image by the three-dimensional perception based upon so-called binocular parallax.

Even when the distance between the pick-up device and CP is measured by the technology of the invention as defined in JP-A-2001-231055 on picking-up the stereoscopic image, the distance between the pick-up device and CP (CP information) is not recorded simultaneously with the stereoscopic image recording. Even if the CP information of the picked-up image is recorded, the CP information is not utilized as a signal for the reference of binocular vision by the technology disclosed in JP-A-Hei 8-262370 when the stereoscopic image is played back.

In particular, when the same content are played back on display devices having different screen sizes, the stereopsis from the screen may vary due to difference in screen size since the amount of the parallax between the right-eye and the left-eye varies, resulting in a problem in that a natural stereoscopic image can not be obtained. Since the stereoscopic image contents for large amusement parks are produced assuming that the display devices have a large size screen on which the contents are displayed, appropriate stereoscopic feeling can not obtained unless the displays have the same screen size. Large size screen provides two strong stereoscopic feeling, making viewers uncomfortable, while small size screen provides less stereoscopic feeling, giving no satisfaction to the viewers.

Since these contents are combinations of various scenes, pick-up conditions, focal-length of the lens of the pick-up unit and the spacing between two pick-up units may not be uniform throughout various contents. If these scenes are simply jointed, different stereoscopic feelings are provided by one content, which provides the viewers with different feeling and physical discomfortability.

Furthermore, the positional relationship between the stereoscopic image pick-up and display device is not necessarily constant and the viewer may not be positioned in the position that is intended by the contents producer. If the viewer is offset from the predetermined viewing position of the stereoscopic display device, he or she is not able to view correct stereoscopic image.

Accordingly, when the stereoscopic video image is produced, the cross-point of the pick-up stereoscopic cameras and the parallax of the computer graphics is adjusted while assuming the size of the display screen on which ultimately the image is displayed. Since the contents which have been produced provide different stereoscopic feeling on the different screens of the stereoscopic image pick-up and display systems, it is necessary to reproduce the stereoscopic video image depending upon the screen size. If the stereoscopic video image is produced by the CG (Computer Graphics), it is necessary to conduct rerendering.

Since there is no way to adjust the parallax which has been determined by the once produced contents when they are played back, the viewer has to adjust the stereoscopic feeling depending upon the distance between the viewing position and the screen.

If the stereoscopic video image is broadcast, there is no way to automatically adjust the stereoscopic feeling of the stereoscopic video image in responsive to an indefinite number of viewers and stereoscopic video image pick-up and display systems having various screen sizes. Therefore, broadcasting of the stereoscopic video images for the indefinite number of viewers is difficult. A technology to adjust the stereoscopic feeling depending upon the screen size is essential for the widespread of the stereoscopic video images.

Therefore, it is an object of the present invention to provide a stereoscopic video image pick-up and display system which is capable of providing the stereoscopic video image having a natural stereopsis even if the video image producing and playback conditions are different.

SUMMARY OF THE INVENTION

In order to solve the above-mentioned object, the present invention adopts means as follows:

An invention as set forth in Claim 1 resides in a stereoscopic video image pick-up and display system comprising a stereoscopic video image pick-up device including two video image pick-up means for outputting video information from said pick-up means; a stereoscopic video image display device for displaying different video images for the eyes of a viewer; and a medium for transmitting said video image information from said stereoscopic video image pick-up device to said stereoscopic video image display device, in which said stereoscopic video image pick-up device includes cross-point measuring means for measuring CP information on the cross-point (CP) of optical axes of said pick-up means and outputs information including the CP information and video image information to said medium; and in which said stereoscopic video image display device includes offset presetting means for offsetting and displaying said different video images based upon said video image information, said cross-point information and information on the size of the image which is displayed by said stereoscopic video image display device.

In accordance with the present invention, a stereoscopic video image can be obtained which is adjusted to provide an optimal stereoscopic degree (depth) depending upon the stereoscopic video image pick-up and display system.

An invention as set forth in Claim 2 resides in a stereoscopic video image display system as defined in Claim 1 wherein said stereoscopic video image display device includes viewer's position information measuring means for measuring information on the position of a viewer relative to a display screen, and further includes offset presetting means for offsetting and displaying said different video images based upon said video image information, said cross-point information, information on the size of the image which is displayed by said stereoscopic video image display device and the information on the position of the viewer.

In accordance with the present invention, a stereoscopic video image having an optimal stereoscopic degree (depth) corresponding to the positions of the stereoscopic video image pick-up and display system and the viewer can be obtained.

An invention as set forth in Claim 3 resides in a stereoscopic video image pick-up and display system as defined in Claim 1 or 2 in which said cross-point measuring means calculates the cross-point position based upon the angle of the intersection of the optical axes in said two pick-up means.

In accordance with the present invention, the distance between two image pick-up means can be measured based upon triangulation techniques and the distance between the pick-up means and the cross-point and object (scene) can be measured based upon the value of the angle at the intersection between the optical axes of said image pick-up means. The distance between two objects can be also measured.

An invention as set forth in Claim 4 resides in a stereoscopic video image pick-up and display system as defined in Claim 1 or 2 in which said cross-point measuring means calculates the cross-point based upon the position of picking-up of an object in said two pick-up means which are disposed in a parallel relationship.

In accordance with the present invention, the distance between two image pick-up means can be measured based upon triangulation techniques and the distance between the pick-up means and the cross-point and object (scene) can be measured based upon the value of the angle at the intersection between the optical axes of said image pick-up means. The distance between two objects can be also measured.

An invention as set forth in Claim 5 resides in a stereoscopic video image pick-up and display system as defined in any of Claims 1 through 4 in which said stereoscopic video image pick-up device is adapted to feed out information on the depth of the areas, the image of which is picked-up in a depth direction and said stereoscopic video image display device includes offset presetting means for offsetting and displaying said different video images based upon said video image information, said cross-point information, information on the size of the image which is displayed by said stereoscopic video image display device and the information on the position of the viewer.

In accordance with the present invention, more appropriate stereoscopic video image display can be carried out since the display means can obtain more exact information on image pick-up conditions.

An invention as set forth in Claim 6 resides in a stereoscopic video image pick-up and display system as defined in Claim 2 in which said viewer's position detecting means is disposed integrally with the main body of said stereoscopic video image pick-up and display system.

In accordance with the present invention, it is not necessary to separately provide the viewers position detecting means in addition to the main body of the stereoscopic video image pick-up and display system.

An invention as set forth in Claim 7 resides in a stereoscopic video image pick-up and display system as defined in Claim 2 in which said viewer's position detecting means is disposed in a position remote from the main body of said stereoscopic video image pick-up and display system.

In accordance with the present invention, the viewer's position detecting means can be disposed in an appropriate position to detect the position of the viewer, so that the position of the viewer can be accurately detected.

An invention as set forth in Claim 8 resides in a stereoscopic video image pick-up and display system as defined in Claim 6 or 7 in which said viewer's position detecting means includes an ultrasonic wave transmitter and ultrasonic wave receiver.

In accordance with the present invention, the detection of a viewer is not liable to be influenced by the peripheral noise in comparison with that using ultra-red means, so that accurate detection can be achieved.

An invention as set forth in Claim 9 resides in a stereoscopic video image pick-up and display system as defined in Claim 6 or 7 in which said viewer's position detecting means detects the position based upon the picked-up image of the viewer.

In accordance with the present invention, the detection of a viewer is not liable to be influenced by the peripheral noise in comparison with that using ultra-red means, so that accurate detection can be achieved.

An invention as set forth in Claim 10 resides in a stereoscopic video image pick-up and display system as defined in any of Claims 1 through 9 in which said offset presetting means presets the offset of the right-eye and left-eye video images based upon the information input to said input means for adjusting the stereoscopic feeling of the image which is displayed by said display means.

In accordance with the present invention, the stereoscopic video image having a stereoscopic degree (depth) which is adjusted to meet the viewer's preferences can be obtained.

An invention as set forth in Claim 11 resides in a stereoscopic video image pick-up and display system as defined in any of Claims 1 through 10 in which said system includes a memory for the left-eye video image for storing a left-eye video image and a memory for the right-eye video image for storing a right-eye video image, said offset presetting means includes timing control means for controlling the timing of the read-out of video image data from said frame memory for left-eye video image and/or said frame memory for right-eye video image; and said timing control means presets the offset of said left-eye video image and right-eye video image by advancing or delaying the timing of the read-out of the video image data from one of said frame memories for left-eye and right-eye video images relative to the timing of the read-out of the video image data from the other of said from memories for the left-eye and right-eye video images.

In accordance with the present invention, an offset of the right-eye and left-eye video images can be preset by a simple circuit.

An invention as set forth in Claim 12 resides in a stereoscopic video image pick-up and display system as defined in any one of Claims 1 through 11 in which said system comprises a stereoscopic video image frame memory for storing the stereoscopic video image therein, and signal switching means for switching between the left-eye video image data read-out from said frame memory for the left-eye video image and right-eye video image read-out from said from memory for said right-eye video image to input the data to said frame memory for the stereoscopic video image.

In accordance with the present invention, video image in which the offset of the right-eye and left-eye video images is preset can be synthesized and be stored in the frame memory.

An invention as set forth in Claim 13 resides in a stereoscopic video image pick-up and display system as defined in any of Claim 1 through 12 in which the offset of said left-eye and right-eye video images is preset by advancing or delaying the horizontal phase of said left-eye and right-eye video images.

In accordance with the present invention, presetting of the offset of the right-eye and left-eye video images can be easily controlled.

An invention as set forth in Claim 14 resides in a stereoscopic video image pick-up and display system as defined in any of Claims 1 through 13 in which an area of one or both of said left-eye and right-eye video image in the vicinity of its lateral edge is enlarged in a horizontal and vertical directions so that it fills a blank area which is caused by the presetting of the offset of said left-eye and right-eye video images.

In accordance with the present invention, display causing no blank area even if the right-eye and left-eye video images are shifted and displayed, and which gives quite normal feeling can be achieved.

An invention as set forth in Claim 15 resides in a stereoscopic video image pick-up and display system as defined in any of Claims 1 through 14 in which said display means includes video image display means for displaying a video image with transmitted light and a light source device, said light source device comprising an LED array in which white LEDs or RGB LEDs are integrally arrayed, said offset presetting means including LED control means for controlling the lighting of said white LEDs or RGB LEDs of said LED array based upon said offset.

In accordance with the present invention, lighting of the light source can be freely achieved by the control of the LED control means and power consumption can be reduced since white LEDs or RBG LEDs having less power consumption and high switching speed are used as the light source.

An invention as set forth in Claim 16 resides in a stereoscopic video image pick-up and display system as defined in Claim 15 in which said LED control means of said offset presetting means controls the lighting of said white LEDs or RGB LEDs based upon said viewer's position information so that the video image which is viewed by a viewer is maintained.

In accordance with the present invention, an appropriate video image can be displayed even if the viewer moves or viewers are in a plurality of different positions.

An invention as set forth in Claim 17 resides in a stereoscopic video image pick-up and display system as defined in Claim 15 in which each LED array which is provided at upper and lower areas of said light source device forms a right-eye video image display unit and left-eye video image display unit.

In accordance with the present invention, contort of display of stereoscopic video image can be achieved at a high freedom degree by controlling the lighting of the right-eye video image display unit and left-eye video image display unit of the LED array by the LED control means.

An invention as set forth in Claim in 18 resides in a stereoscopic video image pick-up and display system as defined in any of Claims 1 through 17 which is adapted to a display system of portable digital assistant (PDA).

In accordance with the present invention, the display of the portable digital assistant can be made stereoscopic.

An invention as set forth in Claim in 19 resides in a stereoscopic video image pick-up and display system as defined in any of Claims 1 through 17 which is adapted to a display system of mobile communication terminal.

In accordance with the present invention, the display of mobile communication terminal can be made stereoscopic.

An invention as set forth in Claim 20 resides in a stereoscopic video image pick-up and display system as defined in any of Claims 1 through 17 which is adapted to a terminal of car navigation system.

In accordance with the present invention, the display of car navigation system can be made stereoscopic.

An invention as set forth in Claim 21 resides in a stereoscopic video image pick-up and display system as defined in any of Claims 17 through 20 in which said video image information and CP information is communicated between said terminal devices.

In accordance with the present invention, stereoscopic video image information can be communicated between terminal devices, so that the same video image information can be shared.

An invention as set forth in Claim 22 resides in a stereoscopic video image pick-up and display system as defined in any of Claims 1 through 21 in which said medium is a communication medium.

In accordance with the present invention, a stereoscopic video image can be displayed even if both the stereoscopic video image pick-up device and stereoscopic video image display device are in the same position, and even if both devices are remote. The communication medium may include wireless communication, wired communication and optical communication.

An invention as set forth in Claim 23 resides in a stereoscopic video image pick-up and display system as defined in any of Claims 1 through 21 in which said medium is a communication medium.

In accordance with the present invention, stereoscopic video image information which is picked-up by the stereoscopic video image pick-up device can be stored and reproduced by the stereoscopic video image display device. The communication medium may include wireless communication, wired communication and optical communication.

BRIEF DESCRIPTION OF THE DRAWINGS

FIG. 12 is a view showing the polarization direction of a checkered plate of the display device.

BEST MODES FOR EMBODYING THE INVENTION

Now, modes of embodying the present invention will be described with reference to the drawings.

Figure 1:
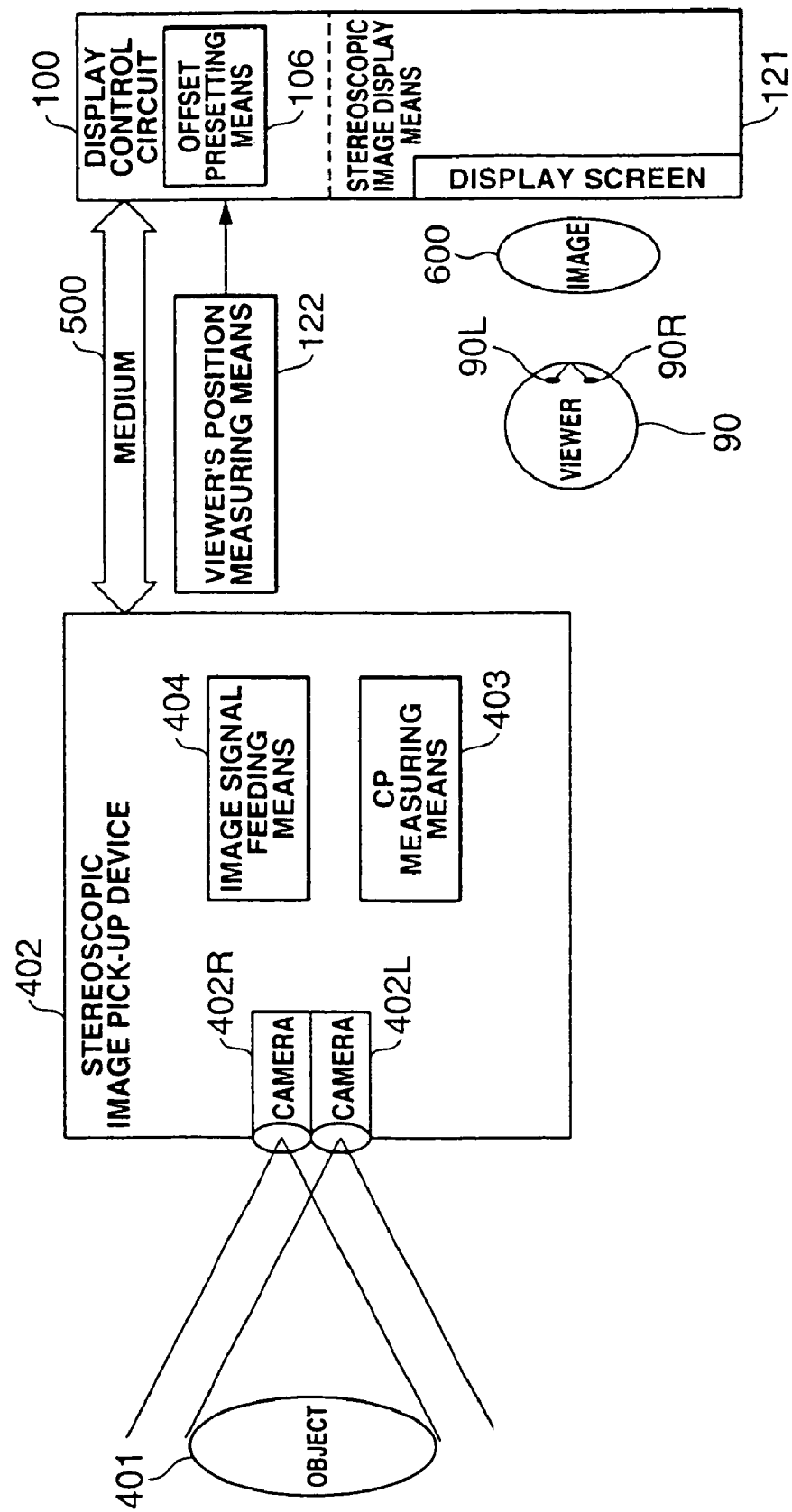
FIG. 1 is a block diagram for showing the basic configuration of the stereoscopic video image pick-up and display device of the present embodiment.
Figure 2:
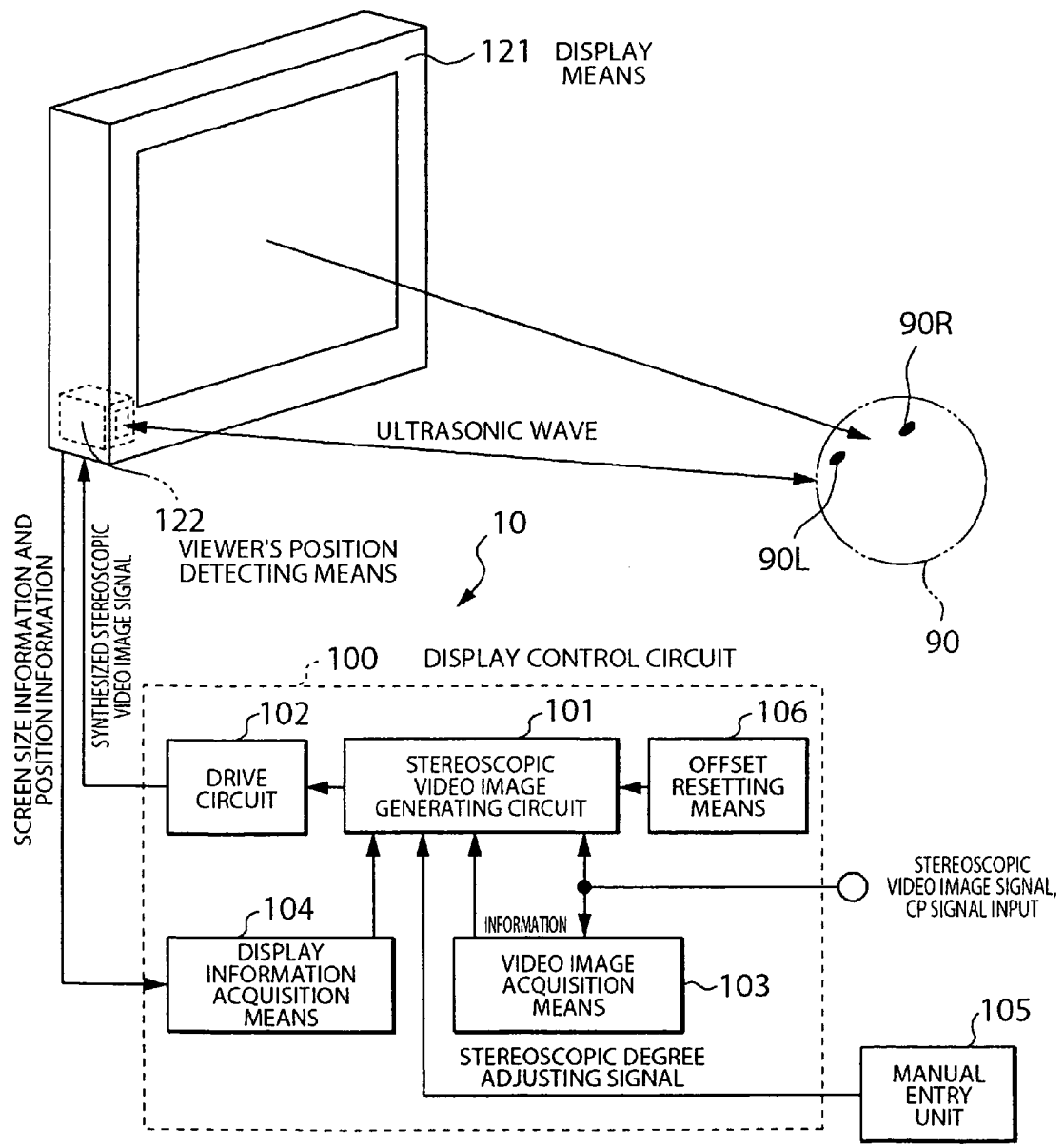
FIG. 2 is a block diagram showing the configuration of the stereoscopic video image pick-up and display system shown in FIG. 1.
Figure 3:
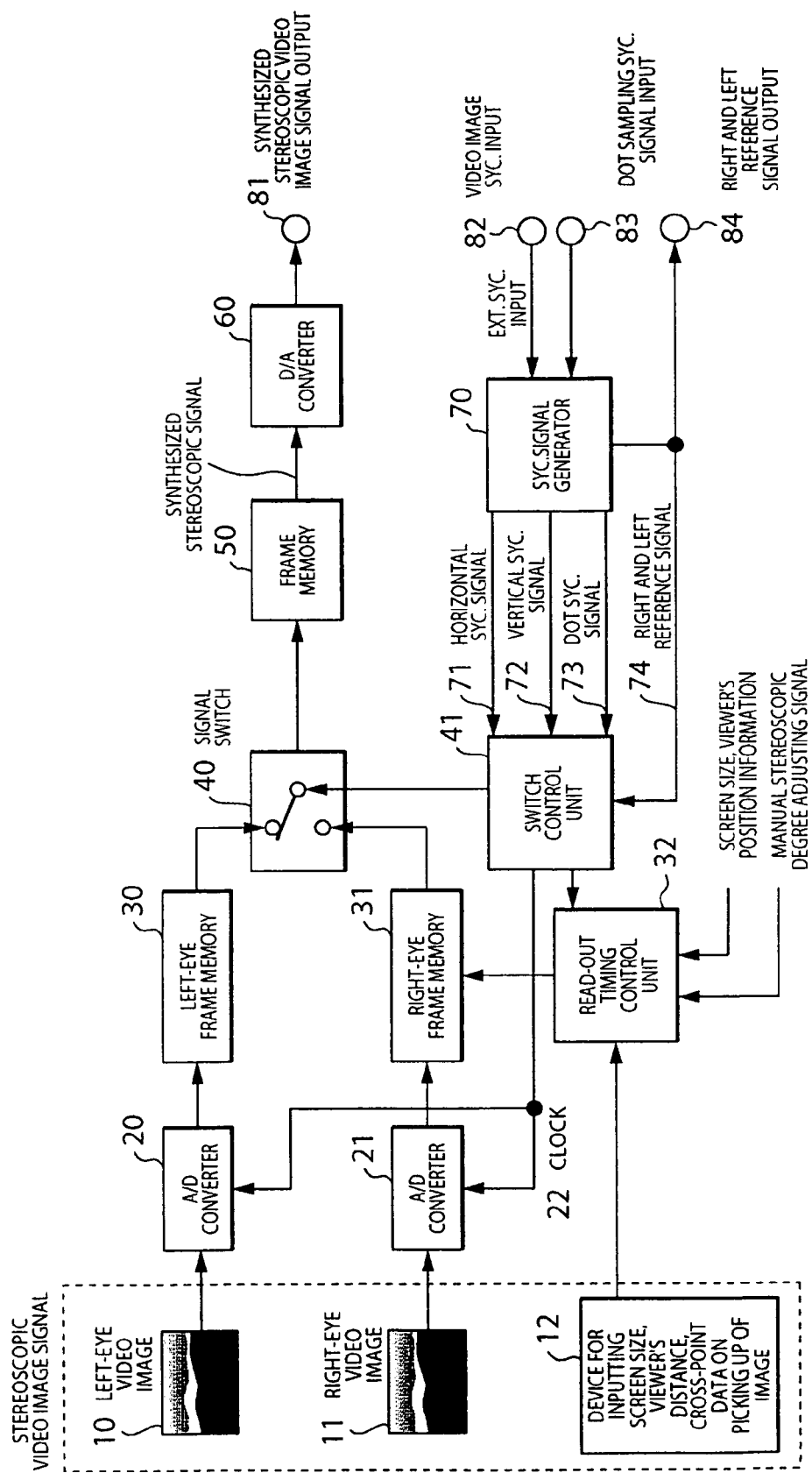
FIG. 3 is a block diagram showing the display control circuit for the stereoscopic video image pick-up and display device shown in FIG. 1.
Figure 4:
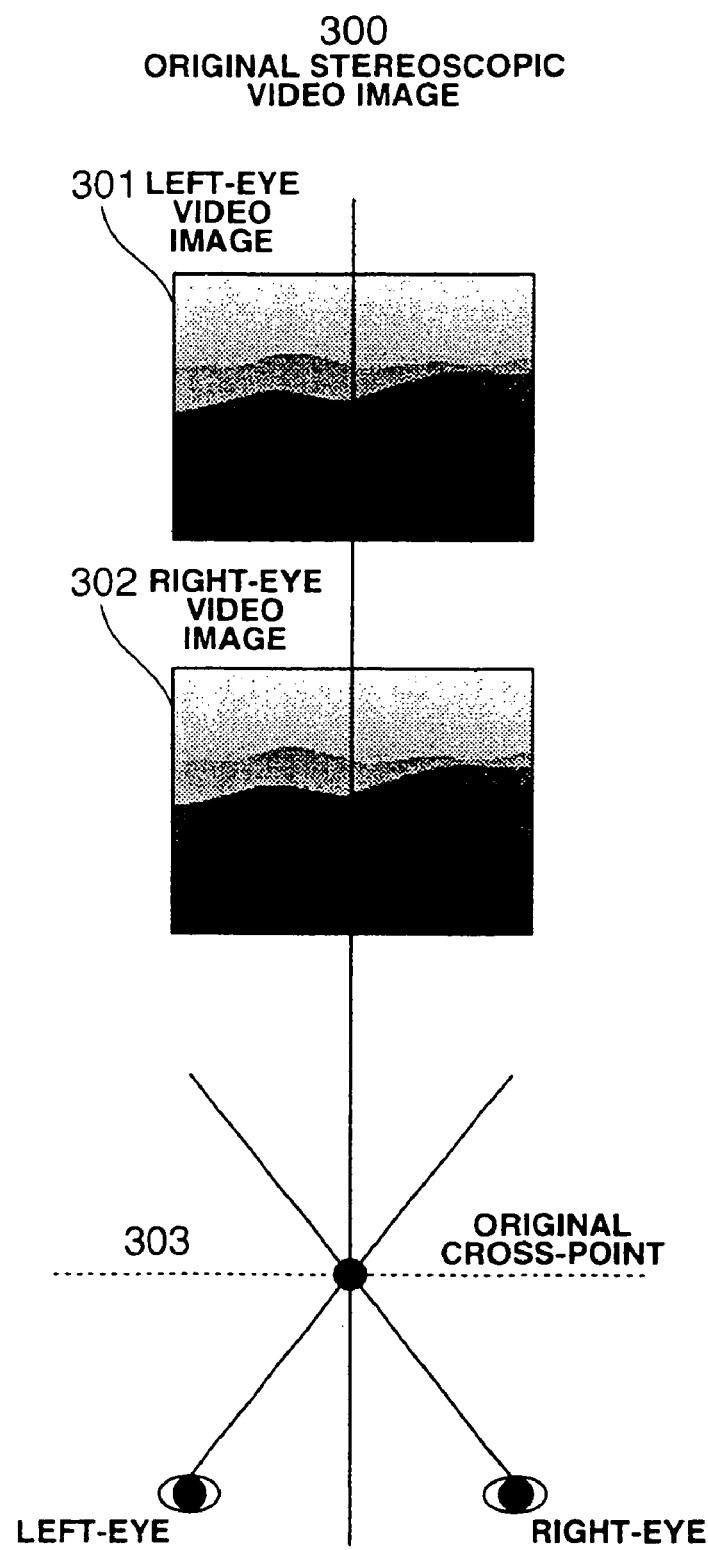
FIG. 4 is a view showing how the stereoscopic image is viewed by a viewer.
Figure 5:
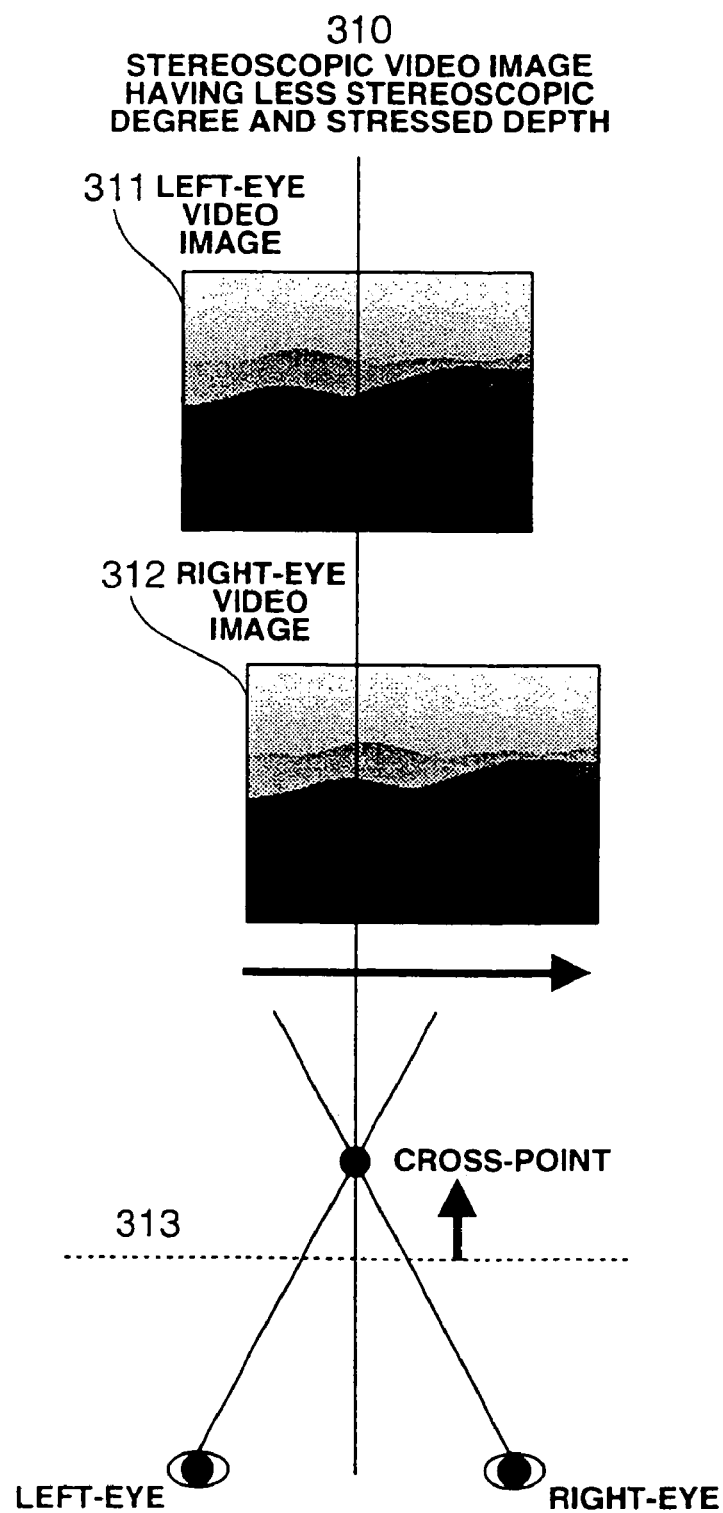
FIG. 5 is a view showing how the stereoscopic image is viewed by a viewer.
Figure 6:
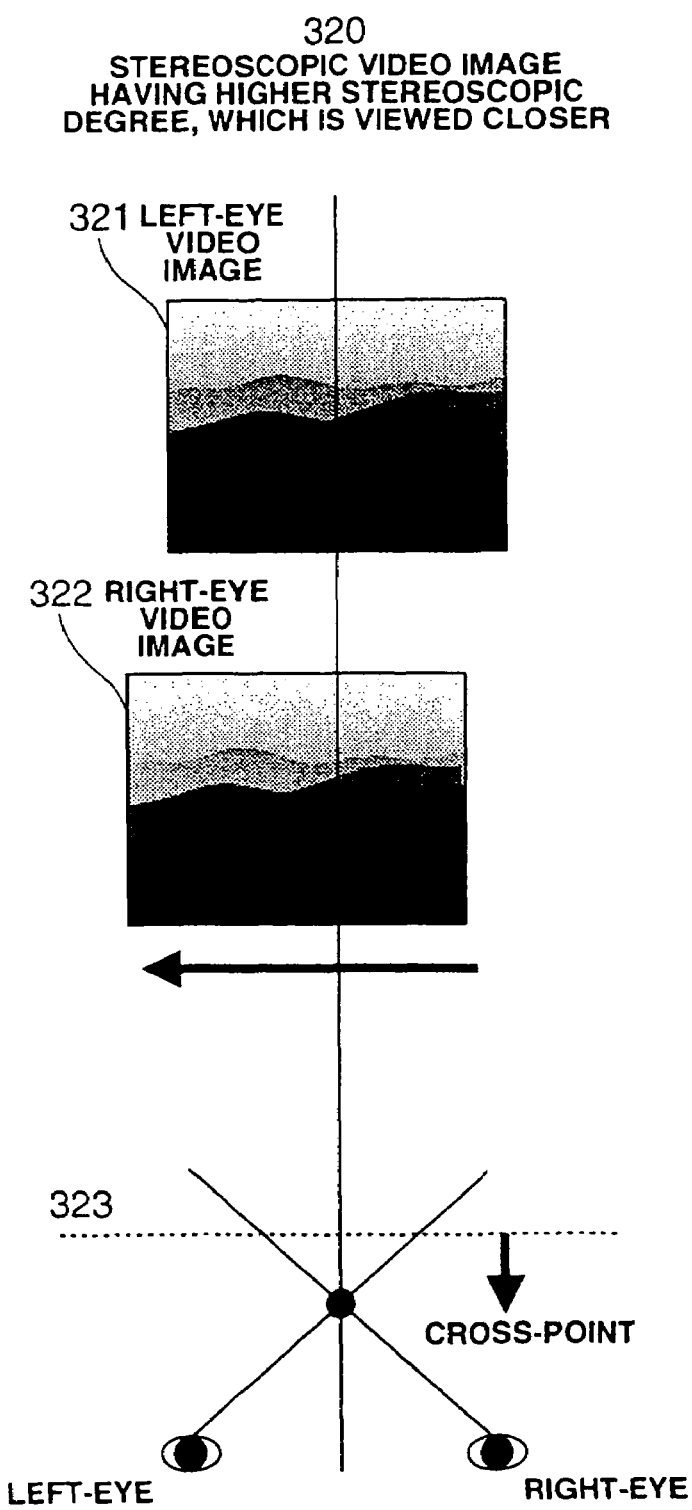
FIG. 6 is a view showing how the stereoscopic image is viewed by a viewer.
Figure 7:
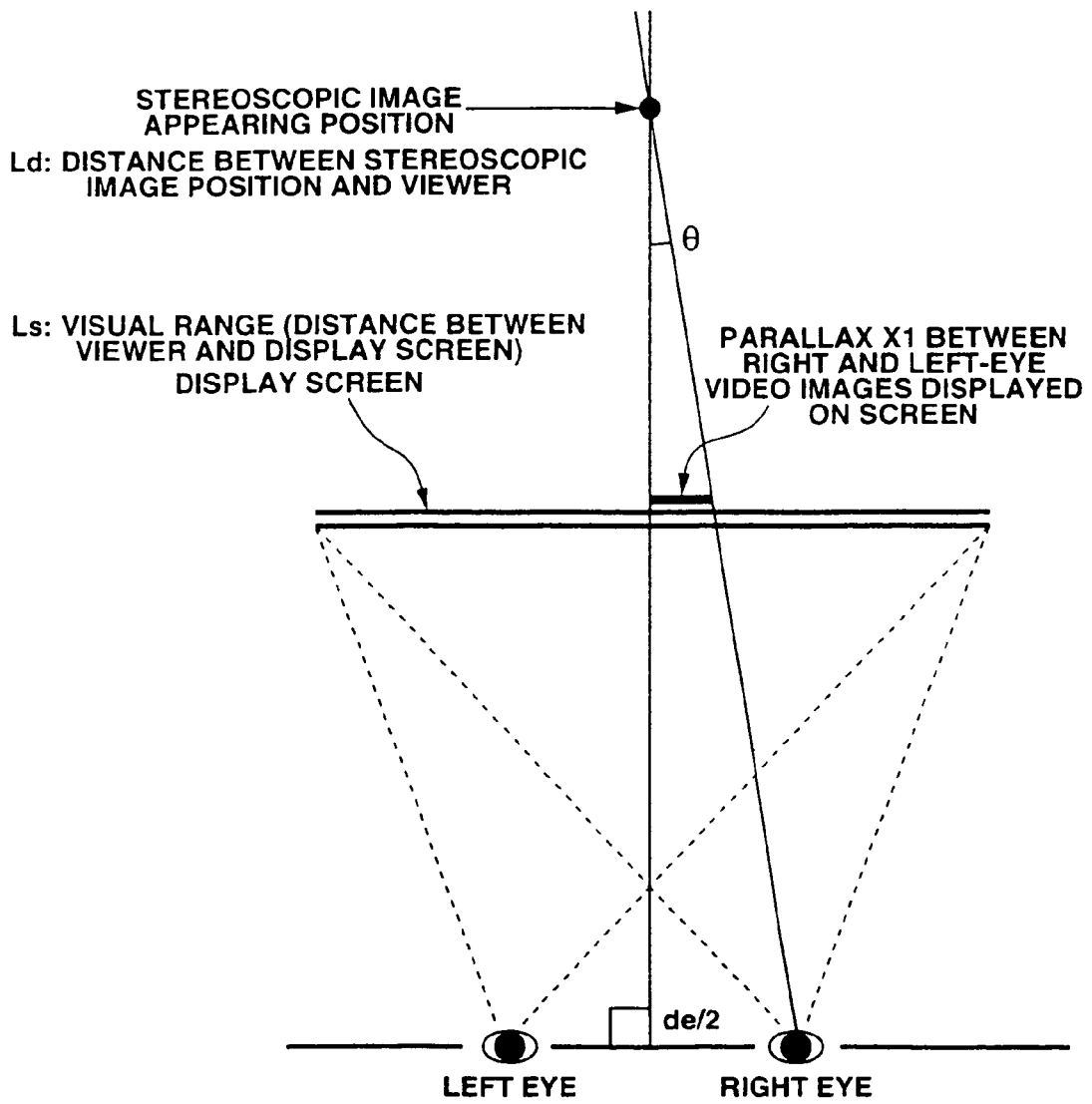
FIG. 7 is a view showing how the stereoscopic image is viewed by a viewer.
Figure 8:
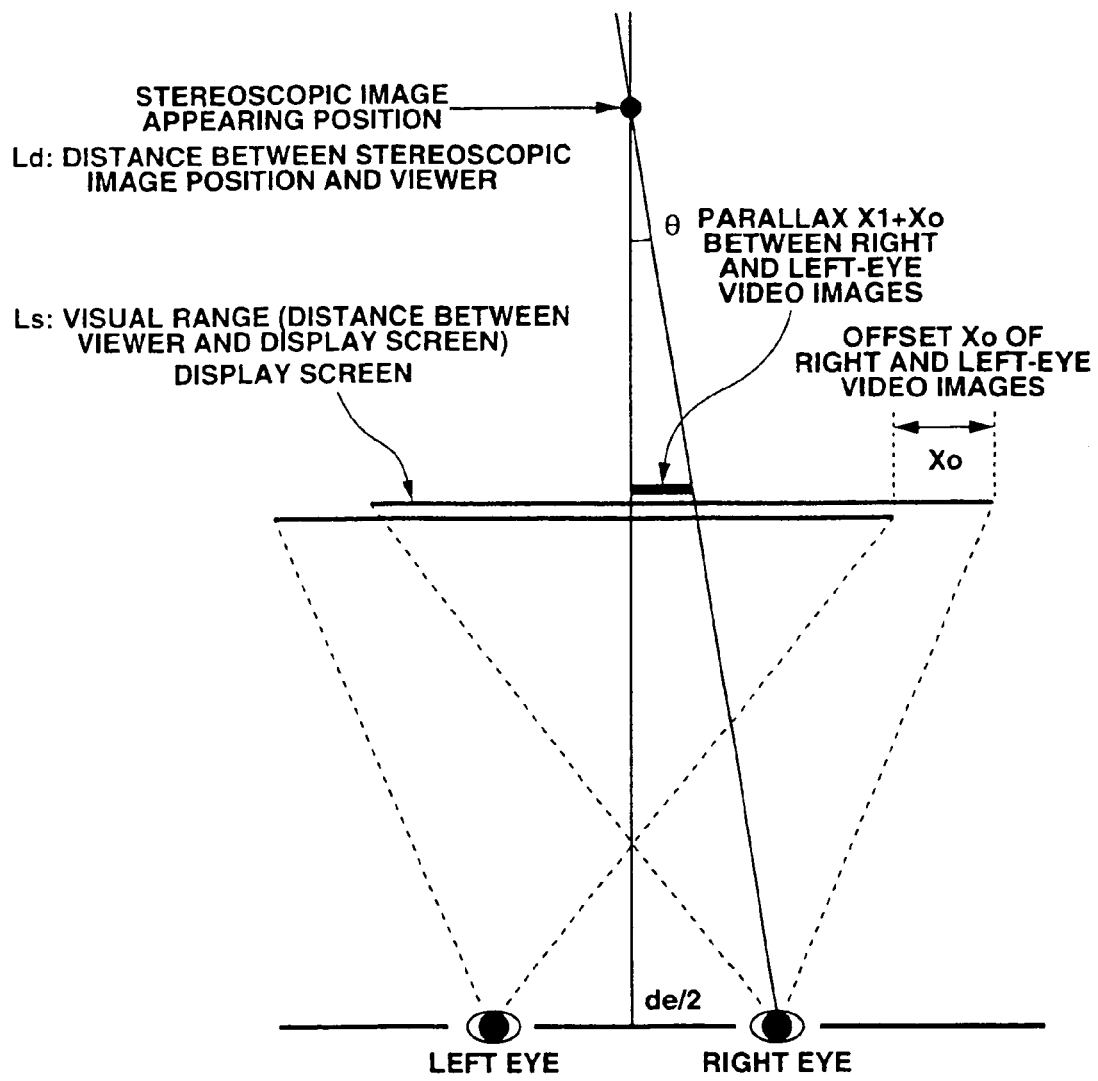
FIG. 8 is a view showing how the stereoscopic image is viewed by a viewer.
Figure 9:
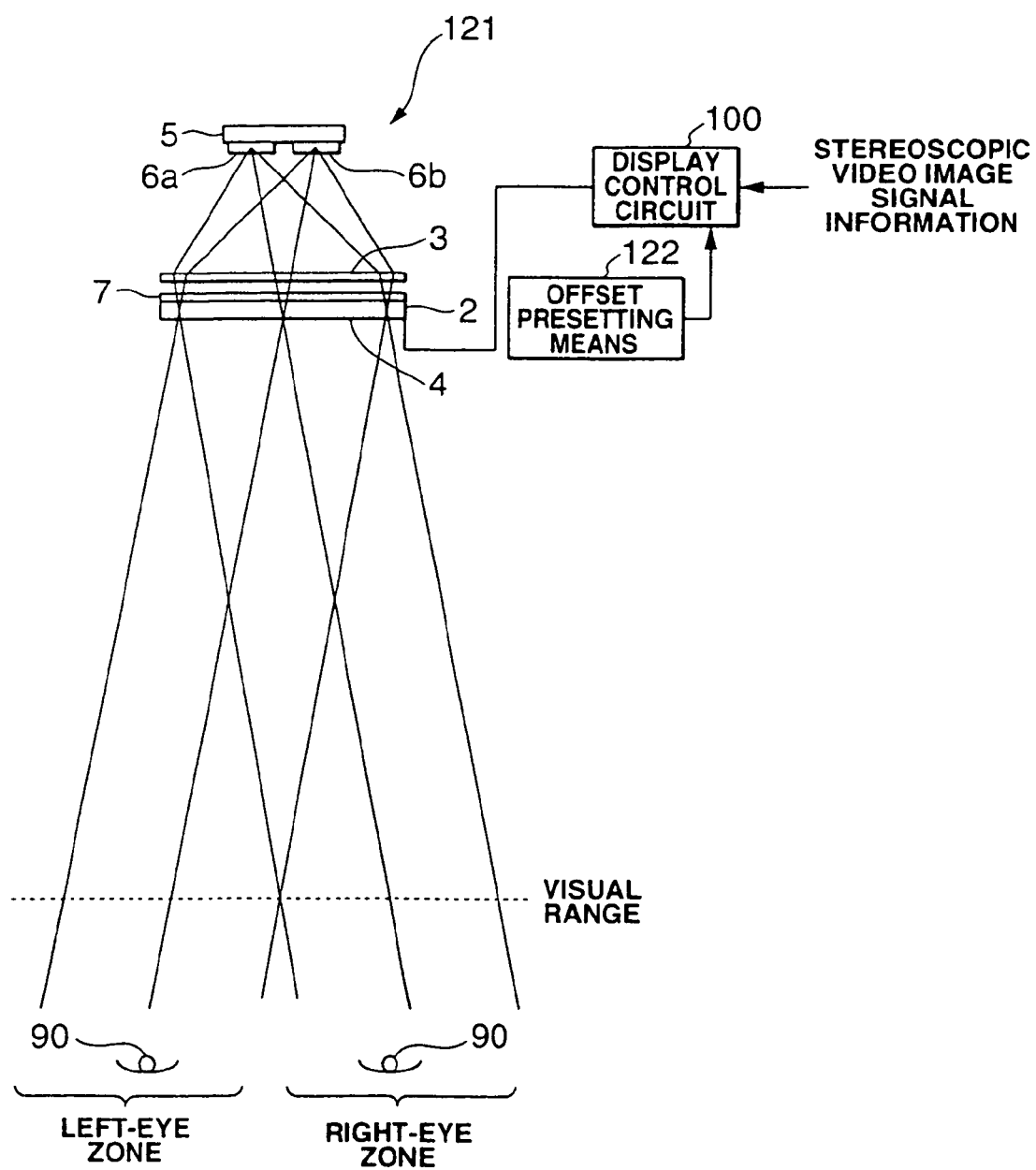
FIG. 9 is a view showing the configuration of the display means.
Figure 10:
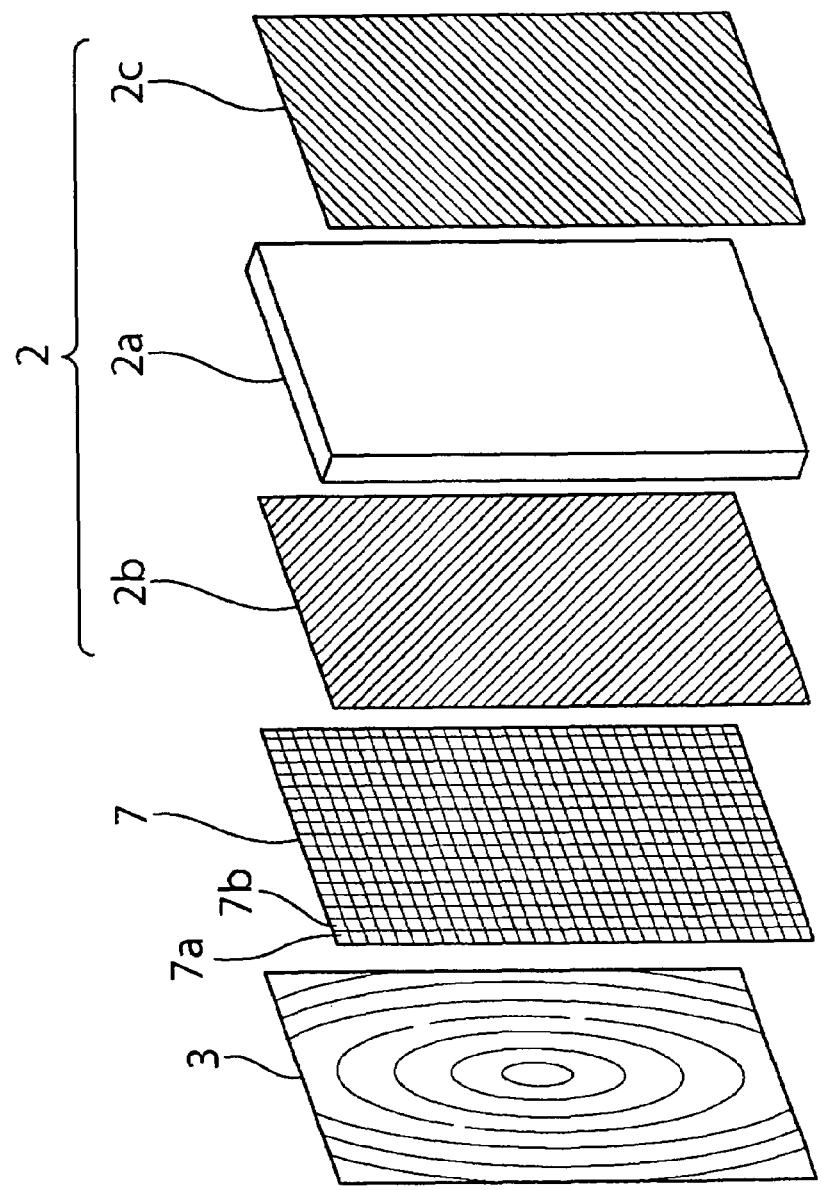
FIG. 10 is an exploded perspective view showing the configuration of the display device in detail.
Figure 11:
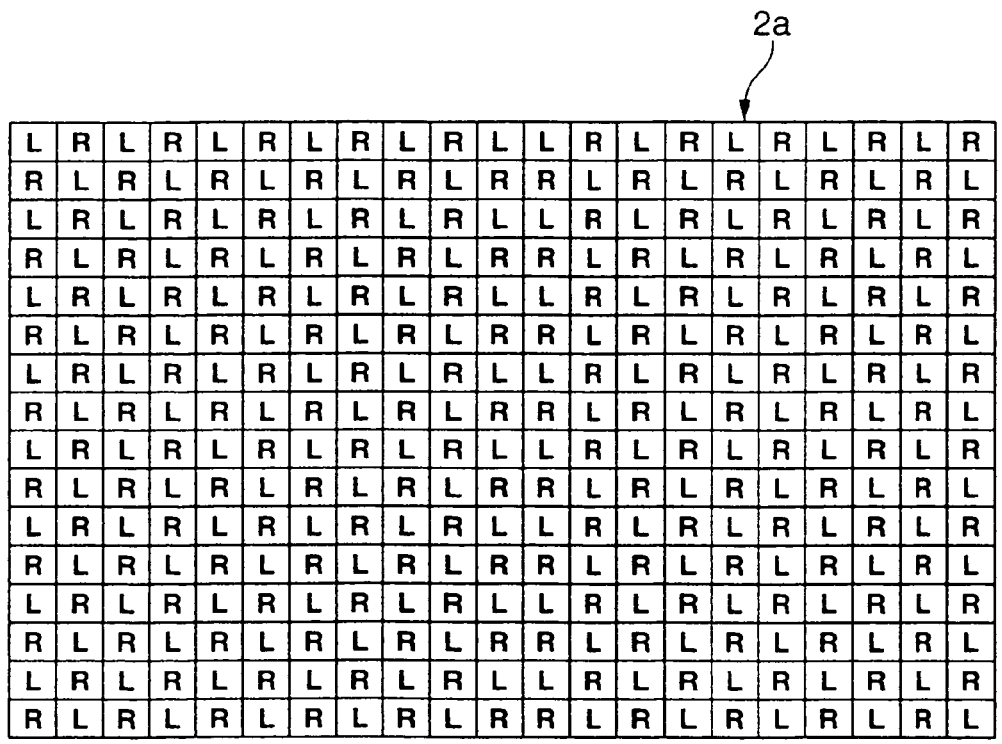
FIG. 11 is a view showing the displaying state of the liquid crystal of the display device.
Figure 13:
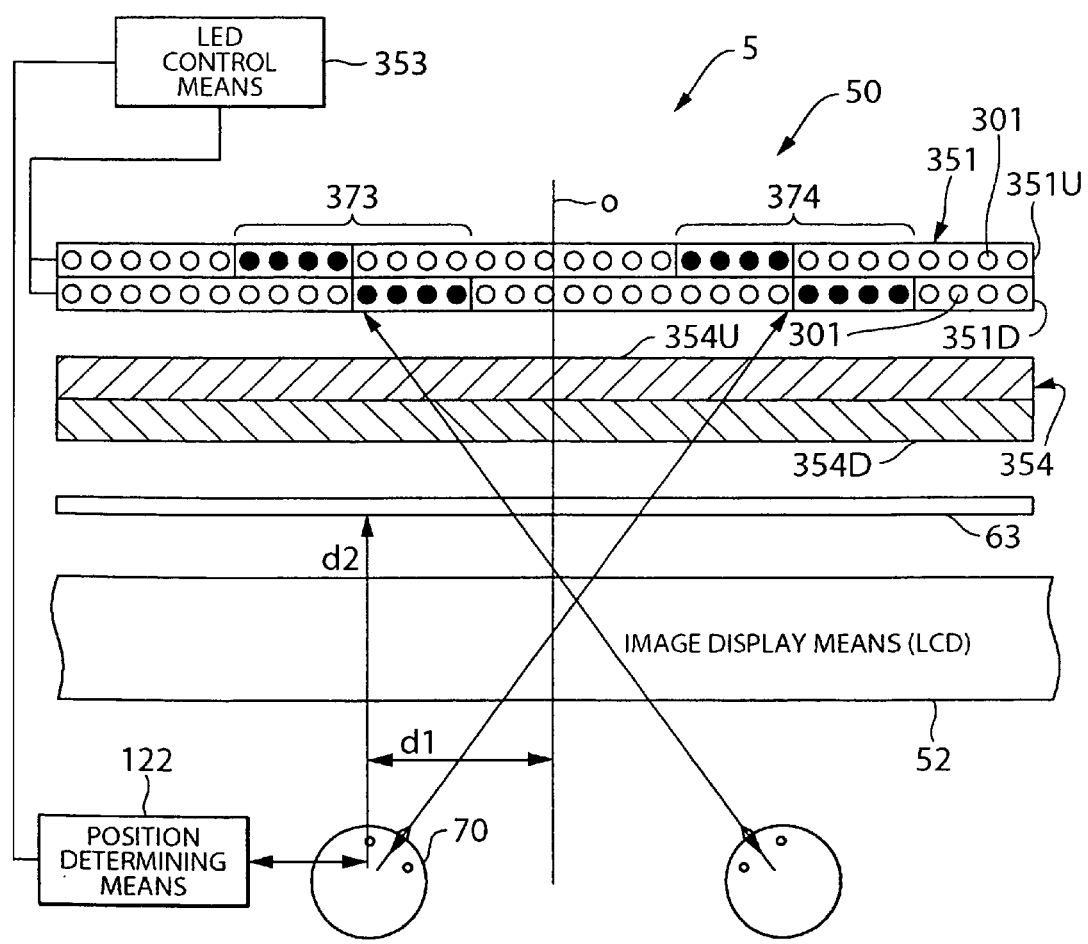
FIG. 13 is a view showing the configuration of the stereoscopic video image pick-up and display system of the other embodiment.
Figure 14:
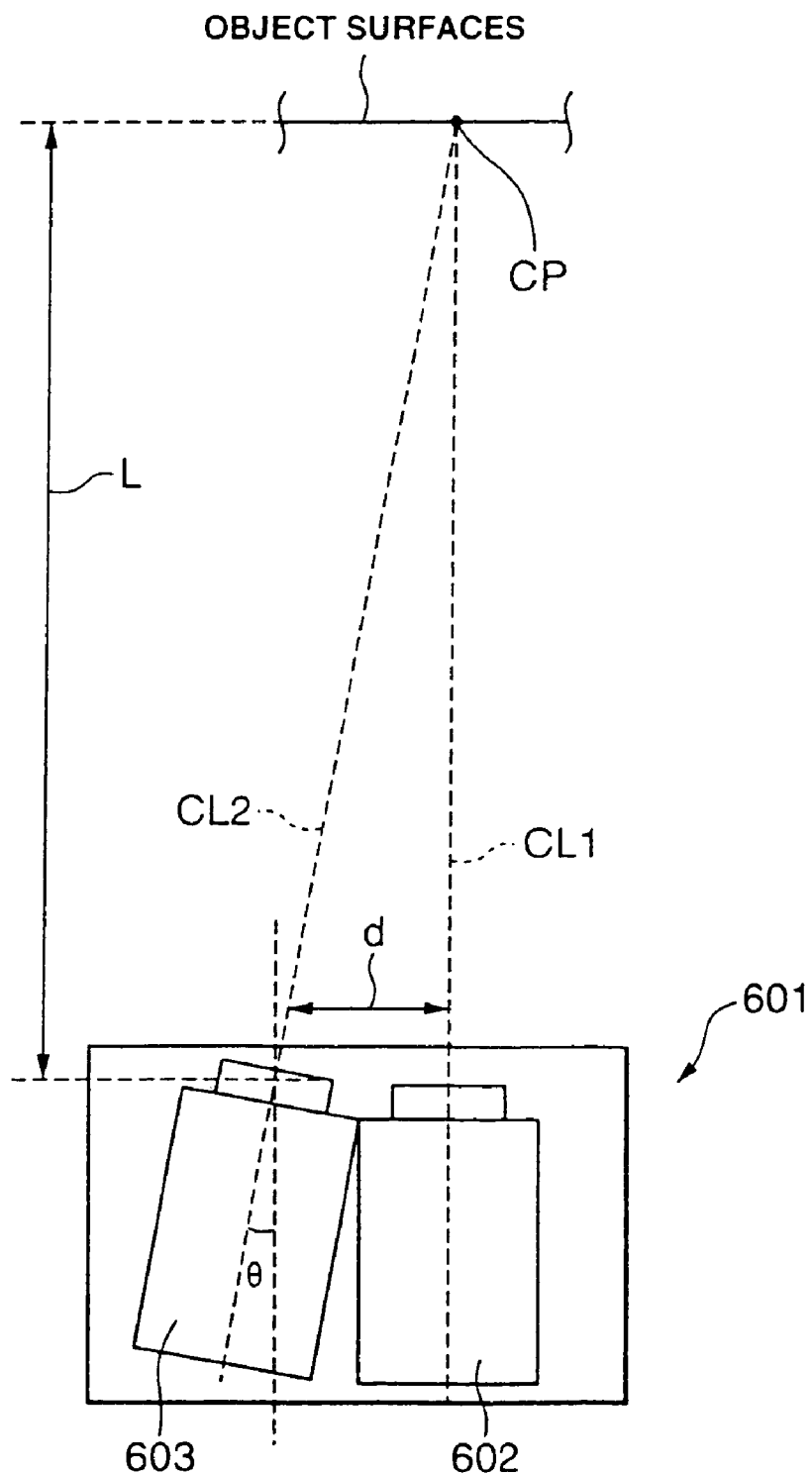
FIG. 14 is a view showing the configuration of the pick-up means of prior art stereoscopic video image pick-up and display system.
Figure 15:
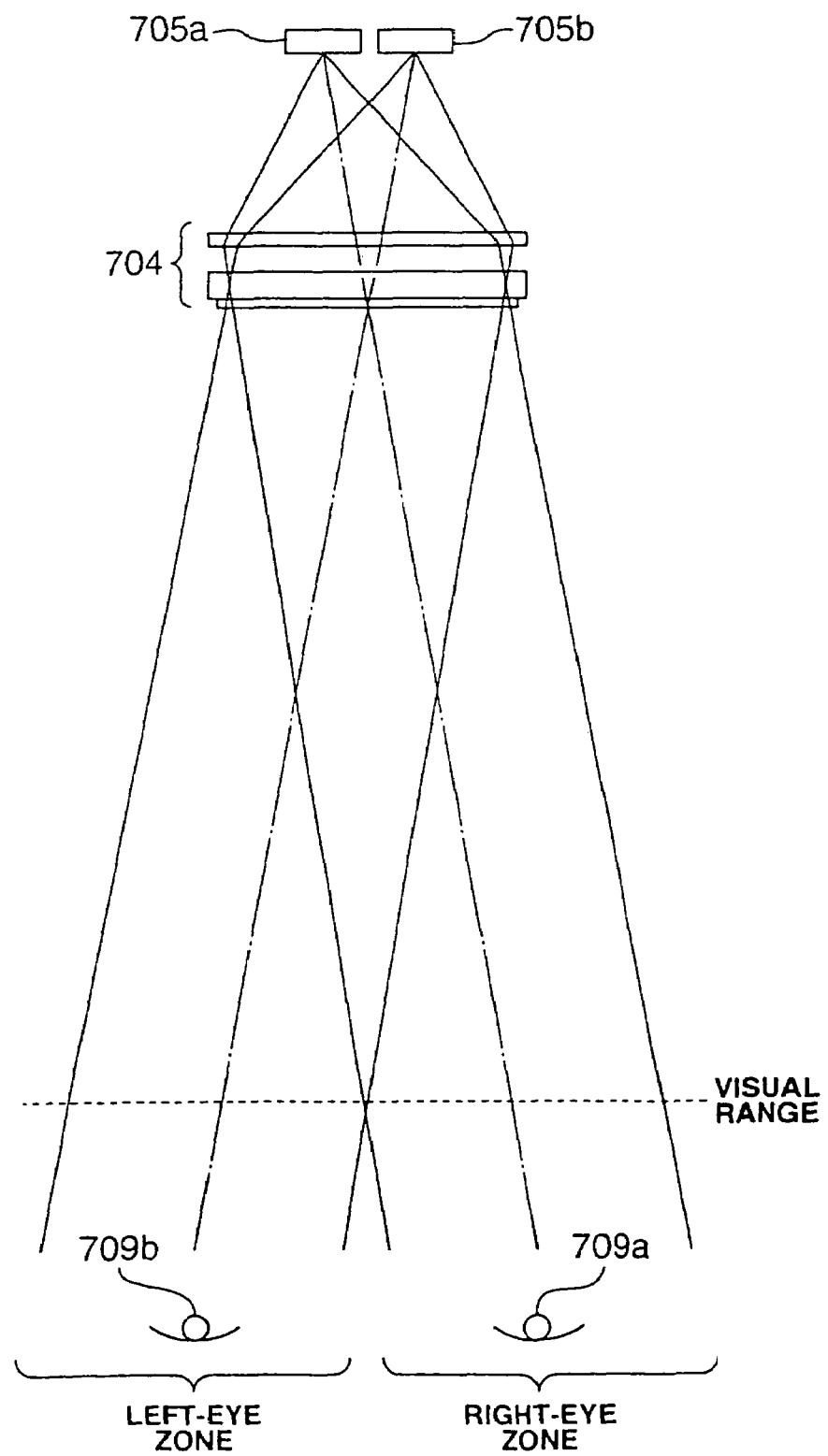
FIG. 15 is a view showing the configuration of the display means of prior art stereoscopic video image pick-up and display system.

FIG. 1 is a block diagram for showing the basic configuration of the stereoscopic video image pick-up and display device of the present embodiment. FIG. 2 is a block diagram showing the configuration of the stereoscopic video image pick-up and display system shown in FIG. 1. FIG. 3 is a block diagram showing the display control circuit for the stereoscopic video image pick-up and display device shown in FIG. 1. FIGS. 4 through 6 are views showing how the stereoscopic image is viewed by a viewer. FIGS. 7 and 8 are views explaining the position at which the stereoscopic image appears. FIG. 9 is a view showing the configuration of the display means. FIG. 10 is an exploded perspective view showing the configuration of the display device in detail. FIG. 11 is a view showing the displaying state of the liquid crystal of the display device. FIG. 12 is a view showing the polarization direction of a checkered plate of the display device. FIG. 13 is a view showing the configuration of the stereoscopic video image pick-up and display system of the other embodiment.

As shown in FIGS. 1 and 2, the stereoscopic video image pick-up and display system one embodiment of the present invention comprises left and right image pick-up means (cameras) 402L, 402R for picking-up an object (subject) 401, CP measuring means 403 for measuring the distance between the cameras and the object and cross-point information (CP information) based upon the angles between the optical axes of the cameras and video signal feeding means 404 for feeding video image information and CP information to a medium 500. The CP information is able to calculate the position of the cross point based upon the picked-up position of the object in two pick-up means which are disposed. The stereoscopic video image pick-up and display system further comprises a display control circuit 100 for controlling the display means 121 to display a stereoscopic video image 600 for a viewer 90 based upon the video image information and CP information which is received via the medium 500 and further comprises display means 121 having a liquid crystal screen. In the present embodiment, information on the depth of the image picked-up area is fed. Appropriate stereoscopic video image display can be accomplished in the stereoscopic video image display device by using the depth in addition to the video image information and the cross-point information.

Preferably the stereoscopic video image pick-up and display system of the present embodiment is adapted to the display system of portable digital assistant (PDA). The stereoscopic video image pick-up and display system of the present embodiment is preferable for the display of mobile communication terminals such as cellular phones.

Preferably the stereoscopic video image pick-up and display system of the present embodiment is adapted to the display system of the car navigation system and may include communication means so that it is possible to communicate the video image information and CP information between the portable digital assistants, mobile communication terminals and car navigation system terminals.

In the present embodiment, the media of the stereoscopic video image display system may be any one of wireless, wired and optical communications. The media may be magnetic recording media such as magnetic disc, optical recording media such as CD, CD-R, CD-RW, DVD, DVD-R, DVD-RW, MD and the like, and semiconductor storage media using memory chips. The stereoscopic video image display system may be applicable to various stereoscopic displays such as stereoscopic television sets and stereoscopic projectors and is also applicable to stereoscopic movie theater motion picture playback device for the playback of stereoscopic video images which are distributed via the Internet, stereoscopic game machines, simulators for aircraft and vehicles.

In the present embodiment, the display control circuit 100 comprises a stereoscopic video image signal generating circuit 101 for generating a stereoscopic video image signal comprising a left-eye and right-eye video images as shown in FIG. 2. The stereoscopic video image signal generating circuit 101 comprises a video image information acquisition means 103 for acquiring video image information on the stereoscopically viewable video images, such as the size of the displayed image which is assumed on production, the position of a viewer and the cross-point information, information acquisition means 104 for acquiring the display device information on the display area of the display means, that is the size of the screen on which the images are actually displayed, the position of the viewer relative to the display device, and offset presetting means for presetting a offset value to display the left-eye and right-eye video images so that they are shifted each other based upon said video image information and said display device information and for causing the display means 121 to display the stereoscopic video image signal providing the viewers with the same stereoscopic feeling irrespective of video and display information representative of different conditions.

The left-eye image 10, right-eye image 11 and the distance 13 (CP information) between the cameras and the cross-point on picking-up of the image are input to the stereoscopic video image signal generating circuit 101 of the present embodiment 101 as data which is recorded on picking-up of the image as shown in FIG. 3. The left-eye image 10 is picked-up by the left-eye camera and the right-eye image 11 is picked-up by the right-eye camera which is juxtaposed with the left-eye camera. The left-eye and right-eye cameras are disposed in such a manner that their optical axes intersect with each other. The intersection of these axes is the cross-point (CP) which is present on a plane of the object.

The image pick-up device includes a cross-point data input device 12 which measures the distance between the cameras and CP by means of laser distance measuring technique or based upon the inclination angle between the optical axes of the left-eye and right-eye cameras or to which an operator inputs the distance. The information on the distance between the cameras and CP is recorded as CP information together with the stereoscopic video image when the stereoscopic video image is picked-up. The distance between the left-eye camera and the right-eye camera (intereye distance) is also recorded as CP information. This distance information corresponds to the distance between the eyes of human.

The left-eye video image 10 which is input to the stereoscopic video signal generating circuit is digitalized by an A/D converter 20 and is stored in a left-eye video image frame memory 30. Similarly, input right-eye video image 11 is digitalized by an A/D converter 21 and is stored in a right-eye video image frame memory 31. A clock signal 22 for A/D conversion is input to the A/D converters 20 and 21 from a switch control unit 1.

The left-eye and right-eye video images which have been digitalized and stored in the frame memories 30 and 31 are input to a signal switch 40. The signal switch 40 records synthesized stereoscopic video image in a synthesis frame memory 50 to generate the synthesized stereoscopic video image signal by switching the read-outs of the left-eye and right-eye video images.

The signal switch 40 is a switch (semiconductor switching element) which is operative in response to a timing signal issued from the switch control unit 41. In the stereoscopic video signal generating circuit, synthesized stereoscopic video signal image in which alternate horizontal lines of the left-eye and right-eye video images 10 and 11 are synthesized is generated from the left-eye and right-eye video images 10 and 11. Since the video image is displayed in every one scanning line in the interlace format, the video signal which is written into the synthesis frame memory 50 is switched for every field (for example, every 16.6833 msec which is a vertical synchronization period of NTSC format) by means of the signal switch 40. On the other hand, since the scanning lines are sequentially displayed in case of non-interlace format, the video signal which is to be written into the synthesis frame memory 50 is switched for every scanning line (for example, every 63.5555 μsec which is a horizontal synchronization period) so that scanning lines of the left-eye and right-eye video signals are alternately displayed.

The timing when the right-video data to be written into the synthesis frame memory 50 is read out from the right-eye video frame memory 31 is controlled by the reading out timing control unit 32, to which the CP information 12, a timing signal for the signal switch 40 from the switch control unit 41, the screen size information and a stereoscopic degree adjusting signal are input. The read-out timing control unit 32 calculates the timing when the read-out from the right-eye video from memory 31 is conducted based upon these items of information and generates a clock signal for reading out of the right-eye video data from the right-eye video frame memory 31 ahead of (or behind of) normal timing, so that the timing which provides the parallax giving appropriate stereoscopic feeling is adjusted. That is, the timing of read-out of the right-eye signal from the right-eye video frame memory 31 is controlled relative to the timing of reading-out of the left-eye signal, so that both signals are read out in such timing to provide optimal stereoscopic feeling.

The switch control unit 41 is operative to control the signal switch 40. It controls the operation of the signal switch 40 in response to a horizontal synchronization signal 71, vertical synchronization signal 72, dot synchronization signal 73 and right and left reference signal 74 input from a synchronization signal generator 70. As mentioned above, the switch control unit 41 presets the timing of switching of the signal switch 40 for writing of video data into synthesis frame memory 50 to generate the synthesized stereoscopic video signal.

The synchronization signal generator 70 generates the horizontal synchronization signal 71 and vertical synchronization signal 92 in response to a video synchronization signal 82 input internally from the stereoscopic video signal generating circuit (for example, display controller) and further generates a dot synchronization signal 73 in response to an externally input dot sampling signal 83 and generates a right and left reference signal 74. The right and left signal 74 identifies whether the video signal is left-eye or right-eye signal when the stereoscopic video signal is transmitted and displayed by using general video signal and is input to the switch control unit and is output externally of the stereoscopic video signal generating circuit.

The D/A converter 60 converts the digitalized video signal into analog signal for outputting it as a synthesized stereoscopic video signal.

Although appropriate stereoscopic feeling is provided by controlling the timing of read-out of the right-eye video data depending upon the CP information 12 and the screen size information in the above-mentioned embodiment, the parallax can be adjusted by controlling the timing of read-out of the right-eye video data depending upon the screen size even if the distance to CP is infinite (there is no CP information 12).

The stereoscopic video signal which is supplied to the above-mentioned stereoscopic video signal generating circuit is recorded by a stereoscopic video image pick-up device having a pair of right and left cameras (lenses and image pick-up elements) and a capability of recording the spacing between the right and left image pick-up elements (intereye distance) and the distance between the cameras and the intersection of the optical axes of the right-eye and left-eye video cameras (cross-point) as cross-point information simultaneously with the right and left video recording. In other words, the stereoscopic video image pick-up device records data on the stereoscopic feeling as well as the stereoscopic video images.

The stereoscopic video signal which is supplied to the above-mentioned stereoscopic video signal generating circuit is produced by a stereoscopic video image producing device having a capability of producing a pair of right and left video images by computer graphics (CG) technology and a capability of recording the intereye distance and the distance to a optical cross point of the right and left video images (a point at which the right and left lines of sight intersects with each other) as cross-point information simultaneously with recording of the right and left video images. In other words, the stereoscopic video image producing device produces and records the data related with stereoscopic feeling together with stereoscopic CG video image.

FIGS. 4 through 6 are views explaining the adjustment of the stereoscopic degree by a change in relative positions of the right and left video images.

FIG. 4 shows a case in which the right-eye and left-eye video images are positioned at the same place as when they are picked-up.

An original video image 300 comprises a left-eye video image 301 and a right-eye video image 302. Under this condition, the positions of the left-eye video image 301 and the right-eye video image 302 are equal to those when they are picked-up, so that relative positions of the left-eye and right-eye video images are correctly reproduced. Therefore, the cross-point 303 is positioned in position (original cross-point) when image picking up is carried out.

FIG. 5 shows that the right-eye video image is shifted rightwards and is displayed.

The stereoscopic video image 310 comprises the left-eye video image 311 and the right-eye video image 312. If an offset in which the right-eye video image is shifted rightwards relative to the left-eye video image by delaying the timing of the read-out of the right-eye video image to that of the left-eye video image (delaying the phase of the right-eye signal) is preset and the video images are displayed, the line of sight from the left-eye to the left-eye video image intersect with the line of sight from the right-eye to the right-eye video image behind the display screen, so that the cross-point 313 moves behind the position on picking-up. Therefore, the stereoscopic video image has less stereoscopic degree and stressed depth than those of the original stereoscopic video image, so that the stereoscopic video image is viewed as far image as a whole.

FIG. 6 shows that the right-eye video image is shifted leftwards and is displayed.

The stereoscopic video image 320 comprises the left-eye video image 321 and the right-eye video image 322. If an offset in which the right-eye video image is shifted leftwards relative to the left-eye video image by delaying the timing of the read-out of the right-eye video image to that of the left-eye video image (advancing the phase of the right-eye signal) is preset and the video images are displayed, the line of sight from the left-eye to the left-eye video image intersect with the line of sight from the right-eye to the right-eye video image in front of the display screen, so that the cross-point 323 moves in front of the position on picking-up. Therefore, the stereoscopic video image has a higher stereoscopic degree and a lower depth than those of the original stereoscopic video image, so that the stereoscopic video image is viewed as closer image as a whole.

When the offset is preset and left-eye and right-eye video images are displayed, any one of the opposite ends of the right eye and the left-eye video images is not displayed. It suffices to enlarge the video images in the vicinity of the blank areas and display them. At this time, the video images are also enlarged in a vertical direction according to the aspect ratio of the display screen. Specifically, although an area in the vicinity of the left end of the right-eye video image is blanked under the offset condition as shown in FIG. 5, the video image of the right-eye video image in the vicinity of the left end thereof is extended until the end reaches the left end of the screen, so that the right-eye video image is displayed. Although an area in the vicinity of the right end of the right-eye video image is blanked under the offset condition as shown in FIG. 6, the video image of the right-eye video image in the vicinity of the right end thereof is extended until the end reaches the right end of the screen, so that right-eye video image is displayed. Natural stereoscopic video image can be displayed without causing any blank area which is offset from the screen by extending the side areas of the offset video image and also extending the side video images in a vertical direction according to the aspect ratio of the screen.

Now, the amount of the offset of the right-eye and left-eye video images will be described.

FIG. 7 shows the relationship between the parallax of the original stereoscopic video image and the stereoscopic image appearing position. In the original stereoscopic video image, the right-eye and left-eye video images are in the positional at the same place as relationship when image picking-up is carried out as shown in FIG. 4. If the stereoscopic image appearing position (the distance between the position at which the stereoscopic view can be viewed and the viewer), the visual range (the distance between the viewer and the display screen), the parallax between the left-eye and right-eye video images which are displayed on the screen and the intereye distance are represented as Cd, Ls, X2 and de (about 65 mm), respectively, the parameters have a relationship which is defined in expression (1) in FIG. 7. The stereoscopic image appearing position Ld can be determined as a function of the parallax X1 by solving the expression (1). The X1 varies depending upon the size of the screen (in proportion to the screen size).

FIG. 8 shows the relationship between the parallax of the right-eye and left-eye video images and the stereoscopic image appearing position when both the right-eye and left-eye images are offset. If the stereoscopic image appearing position (the distance between the position at which the stereoscopic view can be viewed and the viewer), the visual range (the distance between the viewer and the display screen), the offset of the right-eye and left-eye video images, the parallax between the left-eye and right-eye video images which are displayed on the screen and the intereye distance are represented as Cd, Ls, Xo, X1 and de, respectively, the parameters have a relationship which is defined in expression (2) in FIG. 8. In order to obtain the stereoscopic image appearing position Ld which is same as that of the original video image, Ld which is determined by the expression (1) in FIG. 7 is input to expression (2). The offset Xo of the right-eye and left-eye video images is determined.

FIGS. 9 through 13 are views showing the configuration of the stereoscopic video image display device of the present embodiment.

Display means 121 comprises a display device using liquid crystal. As shown in FIGS. 9 through 10, polarization filter units 6a and 6b for the right-eye left-eye 6a and 6b having polarization directions which are at normal angles are disposed on the right and left sides of the light emitting plane of a light source 5. Even if no light emitting element and no polarization filter is used, it suffices to configure the display means so that lights having different polarizations are emitted from different positions. For example, two light emitting elements for emitting lights having different polarization may be provided so that the lights having different polarizations are incident upon a Fresnel lens 3 from different positions.

In the present embodiment, reference numeral 3 denotes a Fresnel lens. The lights which have passed through the filter units 6a, 6b are changed into parallel lights by the Fresnel lens 3 and are incident upon the liquid crystal display element 2. In the present embodiment, the display panel 2a of the liquid crystal display element 2 comprises pixels (L, R) which form first and second video images which are stereoscopically viewed. The pixels L and R are alternately disposed in both lateral and vertical directions to form a checkered pattern. Polarization panels 2b and 2c are applied to the display panel on the sides facing the light source and the viewer, respectively.

In the present embodiment, the liquid crystal display panel comprises two transparent plates (for example, glass plates) between which a liquid crystal is sandwitched. The liquid crystal has an orientation which is twisted at a given angle (for example 90°. Thus, TFT type liquid crystal display panel is formed. Light which is incident upon the liquid crystal display panel is emitted therefrom after the polarization of the incident light is twisted at 90° when no voltage is applied to the liquid crystal. On the other hand, when a voltage is applied to the liquid crystal, the incident light having original polarization is emitted since the twisting of the orientation of the liquid crystal is released.

A checker patterned filter 7 is applied to the side of the display panel facing the light source in the present embodiment.

Therefore, light which has passed through the polarization filter 6 is incident upon the Fresnel lens 3. The Fresnel lens 3 changes the light emitted from the light source in a diffusing manner into substantially parallel light rays, which then pass through the checker patterned filter and are incident upon the liquid crystal display panel.

The light from the checker patterned filter 7 is emitted so that it will not be enlarged in a vertical direction, and is then incident upon the liquid crystal panel 2. In other words, the light which has passed through a predetermined area of the checker patterned filter 7 will pass through a portion of predetermined display unit of the liquid crystal display panel 2.

The lights which were incident upon the liquid crystal display panel and have passed through the right and left polarization filter portions a and b of the polarization filter 6 will be incident upon the Fresnel lens 3 at different angles and are refracted by the Fresnel lens 3 and are emitted from the liquid crystal display panel 2 via right and left different paths.

The checker patterned filter 7 has areas for changing the phases of the light transmitted therethrough, which are spacedly and repeatedly disposed to form a checkered pattern as shown in FIG. 11(1). Specifically, as shown in FIG. 11(2), the light transmitting substrate 171 is provided with areas 7a each on which a half wave length plate 172 having a very small width is placed and areas 7b each on which no half wave length plate 172 is placed. The areas 7a are disposed alternately with areas 7b in a lateral vertical directions. The half wave length plates may be provided on the light source side or display panel side.

In such a manner, the areas 7a which change the phase of the transmitting light by means of half wave length plate 172 and areas 7b which do not change the phase of the transmitting light since no half wave length plate 172 is provided are regularly disposed to form a checkered pattern. The half wave length plates 172 function as plates for shifting the phase of the light transmitting therethrough. The half wave length plates 172 are disposed in such a manner that their optical axes are inclined at 45° relative to the polarization axes of the light transmitted through the right side polarization filter unit a for rotating the polarization axes of the light which has transmitted therethrough by 90°. In other words, the polarization axis of the light which has been transmitted through the left side polarization filter unit b is rotated by 90° so that it is equal to the polarization of the light which has transmitted through the left side polarization filter unit b. The areas 7b having no half wave length plates 172 provided thereon transmit the light which has passed through the left side polarization filter unit b and has the same polarization as that of the polarization plate 2b. The areas 7a having half wave length plates 172 provided thereon rotate the light which has transmitted through the right polarization filter unit a and has a polarization optical axis intersecting with the polarization plate 21 so that its polarization axis is equal to that of the polarization plate 2b.

Repetition of the polarization characteristics of the checkered filter 7 provides polarization of the light transmitting therethrough which is different for each display unit (that is, horizontal line in a lateral direction and vertical line in a vertical direction of the display unit) at the same pitch as the display unit of the liquid crystal display panel 2. The polarization characteristics of the very fine phase shift plate corresponding to each display unit of the liquid crystal display panel 2 in the scanning and subsidiary scanning lines are different, so that the directions of the light emitting from adjacent pixels are different.

In the present invention, repetition of the polarization characteristics of the checker patterned filter 7 may be in such a manner that the polarization characteristics of the checkered filter 7 change for each of a plurality of display units at a pitch of a multiple of that of the display unit of the liquid crystal display panel.

Since it is necessary to impinge light which is different for each of repeated polarization characteristics of the very fine phase shift plate upon the display unit of the liquid crystal display panel 2, the diffusion of light which has transmitted through the checkered filter 7 and impinges upon the liquid crystal panel 2 should be suppressed in a vertical direction.

In other words, the areas 7a which changes the phase of the light passing through the checkered filter 7 make the polarization of the light which has transmitted through the right side polarization filter unit a of the polarization filter 6 equal to that which has transmitted through the left side polarization filter unit b. The areas 7b which do not change the phase of the light of the checker patterned filter 7 transmit the light which has transmitted through the left side polarization filter unit b of the polarization filter 6 as it. The light emitted from the checkered filter 7 has the same polarization with that of the light which has transmitted through the left side polarization filter unit b and is incident upon the polarization plate 2b which is provided on the side of the liquid crystal display panel 2 facing the light source.

The polarization plate 2b functions as a second polarization plate and has polarization characteristics which transmits the light having the same polarization as that of the light which has transmitted through the checker patterned filter 7. In other words, the light which has transmitted through the left side polarization filter b of the polarization filter 6 will transmit through the second polarization filter 2c whereas the light which has transmitted through the right side polarization filter unit a of the polarization filter 6 will be subjected to the rotation of the polarization axis by 90° and transmits through second polarization plate 2b. The polarization plate 2c functions as first polarization plate and has polarization characteristics which transmit the light having polarization characteristics which is different from that of the polarization plate 21 by 90.

Such a combination of the checker patterned filters 7 and 8, polarization plate 2b, liquid crystal panel 2a and polarization plate 2c constitute an image display device.

Therefore, in the stereoscopic video image display device of the present invention right and left images are displayed so that they form a checkered pattern on a plane. Since the filter is also disposed on a plane in a checkered pattern, the stereoscopic video image can be displayed without lowering its horizontal and vertical resolution.

As mentioned above, the stereoscopic video image signal generating circuit 101 generates a synthesized stereoscopic video image signal from the input stereoscopic video image signals and supplies the generated stereoscopic video image signal to a drive circuit 102. Screen size information on the size of the displayable area of the display element provided on the display means 121 is output from the display means 121. The screen size information is preset for each display means and is information on the number of dots on the screen in a lateral and vertical directions and the size of the display area which are stored in a storage (memory) provided in the display means. Sight range information on the distance between the video image displayed on the display means 121 and a viewer who views the image is output from the display means 121. The sight range information may be defined depending upon the size of the display area. Position and distance information may be obtained by providing the display means 121 with means for detecting a viewer so that the positional relation between the viewer 90 and the display means 121 is measured by the display means 121.

The screen size information and sight range and positional information output from the display means 121 is input to the display information acquisition means 104 and is converted into data of the type which is required by the stereoscopic video image signal generating circuit 101 and supplied to the circuit 101.

The video image information acquisition means 103 extracts from the stereoscopic video image signal input to the display control circuit 100, adaptable screen size information on the screen size which is suitable for the playback of the stereoscopic video image, adaptable sight range distance information on the distance between the viewer and the display screen which is suitable for the viewer to view it, camera distance information on the distance between the optical axes of the left-eye and right-eye video image cameras and crosspoint information on the distance to the intersection of the optical axes of the left-eye and right-eye video image cameras and converts it into data of the type which is required by the stereoscopic video image signal generating circuit 101 and supplies the data to the circuit 101.

A stereoscopic degree adjusting signal is input to the stereoscopic video image signal generating circuit 101 from an entry unit 105. The stereoscopic video image signal generating circuit 101 offsets and displays the right-eye and left-eye video images depending upon the stereoscopic degree which is instructed to the entry unit 105 by a viewer, so that the stereoscopic degree of the stereoscopic video image displayed on the display means 121 can be changed.

The manual entry unit 105 may be switch and/or variable resistor which is actuated by the viewer depending upon user's preferences for changing the operation conditions of the display control circuit. The manual entry unit 105 outputs the above-mentioned screen size changing signal to the display information acquisition means 104 and further outputs the above-mentioned stereoscopic degree adjusting signal to the stereoscopic video image signal generating circuit 101 for adjusting the parallax so that it provides the stereoscopic feeling depending upon the viewer's preference.

The right-eye and left-eye video image signals which reaches the right-eye and left-eye respectively are alternately displayed in a checkered pattern. The offset between the right-eye and left-eye video images is preset by delaying or advancing the timing of the read-out of the right-eye video image from the right-eye from memory 31 by the stereoscopic video image generating circuit 101 to delay or advance the horizontal phase of the right-eye and left-eye video images. Thus, the stereoscopic degree is adjusted by adjusting the parallax between the eyes.

Now, a case when the position of a viewer is changed will be described.

The position information is detected by the viewer position detecting means 122. Then this information is acquired by the display information acquisition means 104. The offset is calculated by the offset presetting means 105. The display means 102 is driven by the drive circuit 102 so that the video images can be normally viewed depending upon the distance of the viewer and his or her position in a lateral direction.

Another embodiment of the present invention will be described. FIG. 13 show another embodiment in which the light source 5 of the liquid crystal display device is changed. In the embodiment shown in FIG. 13, a plurality of white LEDs 301 are juxtaposed in a horizontal direction. The liquid crystal display device comprises two column of left and right LED arrays 351U, 351D, an image display means (liquid crystal display plate) 354, and two polarizing elements 354 corresponding to the LED arrays 351U, 351D having a polarization direction which is normal to the Fresnel lens 63 which functions as a convex lens.

Lighting of the LED array 351 is controlled by LED control means 353 provided on the display control circuit 100. The LEDs which are lit and are not lit are represented as ● and ○, respectively in FIG. 13.

In the present embodiment, there is provided with viewer's position determining means 122 which measures the displacement d1 of the viewer 70 from the optical axis of the image display means 52 and the distance d2 between the viewer and the image display device 252 for generating a measurement signal. In the present embodiment, the viewer's position determining means 122 may be ultrasonic type sensor, ultra-red ray type sensor or any other means if it is suitable.

An LED control means 353 controls the lighting portions 374, 373 of the white LED1 of the LED array 351 to light them. The LED control means 353 is capable of moving the lighting position of the LED array 351 at a high speed as represented by an arrow D in response to the movement of the viewer as represented by an arrow d so that natural stereoscopic images can be always displayed.

Since no mechanical operation is accompanied by the control of the light source of the image display device, high speed and high precision operation is enabled and the image display device has a high durability and the configuration of control mechanism of the servo-control can be simplified.

If the number and positions of viewers relative to the image display device is measured and output by the position determining means 122 and lighting of the LED array 351 is controlled by the LED control means 353, appropriate stereoscopic image can be displayed for the viewers who are positioned in different positions.

In the embodiment shown in FIG. 13, the LED array 351 of the light source 5 comprises upper and lower arrays 351U and 351D. Right and left polarization filters 354 corresponding to the upper and lower arrays 351U and 351D are disposed in positions corresponding to each white LED 301 of the upper and lower arrays 351U and 351D, respectively. The polarization filter 354 comprise polarization filters 354U and 354D through which the light from the upper and lower arrays 351U and 351D of the LED array passes. The polarization filters 354U, 354D comprises polarization filters having polarization directions which intersect at right angles.

Now, a case in which there is one viewer will be described.

The position of the viewer 70 is determined by the above-mentioned viewer position detecting means 122 and the lighting position 374 of the upper and lower LED arrays 354U and 354D are lit for displaying the stereoscopic image for the viewer. The lighting position is moved using the viewer's position detecting means which has been described in the foregoing embodiment, so that the stereoscopic image can be displayed depending upon the position of the viewer 70.

Now, a case in which there are a plurality of viewers, for example, two viewers 70, 71 will be described. At this time, LED control means 353 receives a signal from the viewer's position detection means 122 to preset two lighting positions 373, 374 on two LED arrays 351, so that these lighting areas are alternately lit at a high speed. Accordingly, LED1 other than those at lighting areas 373, 374 is not lit at one time and any one of the lighting areas 373 and 374 is lit at other times.

Accordingly, unwanted afterimage and interference of images can be eliminated and power consumption can be reduced by carrying out the blinking control so that the white LED 1 is turned off for the period of the synchronization signal and blanking period of the image display means 52. Furthermore, an image having a wide visual field angle can be obtained using a small number of LEDs in planar image display device together with a Fresnel lens and limited light source.

Since the right and left LEDs are disposed so that they are divided into upper and lower arrays in the present embodiment, the spacing between LEDs for display of the right and left areas is made larger so that interference of light from each LED is reduced, cross-talk between right and left images which gives an adverse influence upon the stereoscopic image is reduced.

INDUSTRIAL UTILIZATION

An invention as set forth in Claim 1 resides in a stereoscopic video image pick-up and display system comprising a stereoscopic video image pick-up device including two video image pick-up means for outputting video information from said pick-up means; a stereoscopic video image display device for displaying different video images for the eyes of a viewer; and a medium for transmitting said video image information from said stereoscopic video image pick-up device to said stereoscopic video image display device, in which said stereoscopic video image pick-up device includes cross-point measuring means for measuring CP information on the cross-point (CP) of optical axes of said pick-up means and outputs information including the CP information and video image information to said medium; and in which said stereoscopic video image display device includes offset presetting means for offsetting and displaying said different video images based upon said video image information, said cross-point information and information on the size of the image which is displayed by said stereoscopic video image display device.

In accordance with the present invention, a stereoscopic video image can be obtained which is adjusted to provide an optimal stereoscopic degree (depth) depending upon the stereoscopic video image pick-up and display system.

An invention as set forth in Claim 2 resides in a stereoscopic video image display system as defined in Claim 1 wherein said stereoscopic video image display device includes viewer's position information measuring means for measuring information on the position of a viewer relative to a display screen, and further includes offset presetting means for offsetting and displaying said different video images based upon said video image information, said cross-point information, information on the size of the image which is displayed by said stereoscopic video image display device and the information on the position of the viewer.

In accordance with the present invention, a stereoscopic video image having an optimal stereoscopic degree (depth) corresponding to the positions of the stereoscopic video image pick-up and display system and the viewer can be obtained.

An invention as set forth in Claim 3 resides in a stereoscopic video image pick-up and display system as defined in Claim 1 or 2 in which said cross-point measuring means calculates the cross-point position based upon the angle of the intersection of the optical axes in said two pick-up means.

In accordance with the present invention, the distance between two image pick-up means can be measured based upon triangulation techniques and the distance between the pick-up means and the cross-point and object (scene) can be measured based upon the value of the angle at the intersection between the optical axes of said image pick-up means. The distance between two objects can be also measured.

An invention as set forth in Claim 4 resides in a stereoscopic video image pick-up and display system as defined in Claim 1 or 2 in which said cross-point measuring means calculates the cross-point based upon the position of picking-up of an object in said two pick-up means which are disposed in a parallel relationship.

In accordance with the present invention, the distance between two image pick-up means can be measured based upon triangulation techniques and the distance between the pick-up means and the cross-point and object (scene) can be measured based upon the value of the angle at the intersection between the optical axes of said image pick-up means. The distance between two objects can be also measured.

An invention as set forth in Claim 5 resides in a stereoscopic video image pick-up and display system as defined in any of Claims 1 through 4 in which said stereoscopic video image pick-up device is adapted to feed out information on the depth of the areas, the image of which is picked-up in a depth direction and said stereoscopic video image display device includes offset presetting means for offsetting and displaying said different video images based upon said video image information, said cross-point information, information on the size of the image which is displayed by said stereoscopic video image display device and the information on the position of the viewer.

In accordance with the present invention, more appropriate stereoscopic video image display can be carried out since the display means can obtain more exact information on image pick-up conditions.

An invention as set forth in Claim 6 resides in a stereoscopic video image pick-up and display system as defined in Claim 2 in which said viewer's position detecting means is disposed integrally with the main body of said stereoscopic video image pick-up and display system.

In accordance with the present invention, it is not necessary to separately provide the viewer's position detecting means in addition to the main body of the stereoscopic video image pick-up and display system.

An invention as set forth in Claim 7 resides in a stereoscopic video image pick-up and display system as defined in Claim 2 in which said viewer's position detecting means is disposed in a position remote from the main body of said stereoscopic video image pick-up and display system.

In accordance with the present invention, the viewer's position detecting means can be disposed in an appropriate position to detect the position of the viewer, so that the position of the viewer can be accurately detected.

An invention as set forth in Claim 8 resides in a stereoscopic video image pick-up and display system as defined in Claim 6 or 7 in which said viewer's position detecting means includes an ultrasonic wave transmitter and ultrasonic wave receiver.

In accordance with the present invention, the detection of a viewer is not liable to be influenced by the peripheral noise in comparison with that using ultra-red means, so that accurate detection can be achieved.

An invention as set forth in Claim 9 resides in a stereoscopic video image pick-up and display system as defined in Claim 6 or 7 in which said viewer's position detecting means detects the position based upon the picked-up image of the viewer.

In accordance with the present invention, the detection of a viewer is not liable to be influenced by the peripheral noise in comparison with that using ultra-red means, so that accurate detection can be achieved.

An invention as set forth in Claim 10 resides in a stereoscopic video image pick-up and display system as defined in any of Claims 1 through 9 in which said offset presetting means presets the offset of the right-eye and left-eye video images based upon the information input to said input means for adjusting the stereoscopic feeling of the image which is displayed by said display means.

In accordance with the present invention, the stereoscopic video image having a stereoscopic degree (depth) which is adjusted to meet the viewer's preferences can be obtained.

An invention as set forth in Claim 11 resides in a stereoscopic video image pick-up and display system as defined in any of Claims 1 through 10 in which said system includes a memory for the left-eye video image for storing a left-eye video image and a memory for the right-eye video image for storing a right-eye video image, said offset presetting means includes timing control means for controlling the timing of the read-out of video image data from said frame memory for left-eye video image and/or said frame memory for right-eye video image; and said timing control means presets the offset of said left-eye video image and right-eye video image by advancing or delaying the timing of the read-out of the video image data from one of said frame memories for left-eye and right-eye video images relative to the timing of the read-out of the video image data from the other of said from memories for the left-eye and right-eye video images.

In accordance with the present invention, an offset of the right-eye and left-eye video images can be preset by a simple circuit.

An invention as set forth in Claim 12 resides in a stereoscopic video image pick-up and display system as defined in any one of Claims 1 through 11 in which said system comprises a stereoscopic video image frame memory for storing the stereoscopic video image therein, and signal switching means for switching between the left-eye video image data read-out from said frame memory for the left-eye video image and right-eye video image read-out from said from memory for said right-eye video image to input the data to said frame memory for the stereoscopic video image.

In accordance with the present invention, video image in which the offset of the right-eye and left-eye video images is preset can be synthesized and be stored in the frame memory.

An invention as set forth in Claim 13 resides in a stereoscopic video image pick-up and display system as defined in any of Claim 1 through 12 in which the offset of said left-eye and right-eye video images is preset by advancing or delaying the horizontal phase of said left-eye and right-eye video images.

In accordance with the present invention, presetting of the offset of the right-eye and left-eye video images can be easily controlled.

An invention as set forth in Claim 14 resides in a stereoscopic video image pick-up and display system as defined in any of Claims 1 through 13 in which an area of one or both of said left-eye and right-eye video image in the vicinity of its lateral edge is enlarged in a horizontal and vertical directions so that it fills a blank area which is caused by the presetting of the offset of said left-eye and right-eye video images.

In accordance with the present invention, display causing no blank area even if the right-eye and left-eye video images are shifted and displayed, and which gives quite normal feeling can be achieved.

An invention as set forth in Claim 15 resides in a stereoscopic video image pick-up and display system as defined in any of Claims 1 through 14 in which said display means includes video image display means for displaying a video image with transmitted light and a light source device, said light source device comprising an LED array in which white LEDs or RGB LEDs are integrally arrayed, said offset presetting means including LED control means for controlling the lighting of said white LEDs or RGB LEDs of said LED array based upon said offset.

In accordance with the present invention, lighting of the light source can be freely achieved by the control of the LED control means and power consumption can be reduced since white LEDs or RBG LEDs having less power consumption and high switching speed are used as the light source.

An invention as set forth in Claim 16 resides in a stereoscopic video image pick-up and display system as defined in Claim 15 in which said LED control means of said offset presetting means controls the lighting of said white LEDs or RGB LEDs based upon said viewer's position information so that the video image which is viewed by a viewer is maintained.

In accordance with the present invention, an appropriate video image can be displayed even if the viewer moves or viewers are in a plurality of different positions.

An invention as set forth in Claim 17 resides in a stereoscopic video image pick-up and display system as defined in Claim 15 in which each LED array which is provided at upper and lower areas of said light source device forms a right-eye video image display unit and left-eye video image display unit.

In accordance with the present invention, contort of display of stereoscopic video image can be achieved at a high freedom degree by controlling the lighting of the right-eye video image display unit and left-eye video image display unit of the LED array by the LED control means.

An invention as set forth in Claim in 18 resides in a stereoscopic video image pick-up and display system as defined in any of Claims 1 through 17 which is adapted to a display system of portable digital assistant (PDA).

In accordance with the present invention, the display of the portable digital assistant can be made stereoscopic.

An invention as set forth in Claim in 19 resides in a stereoscopic video image pick-up and display system as defined in any of Claims 1 through 17 which is adapted to a display system of mobile communication terminal.

In accordance with the present invention, the display of mobile communication terminal can be made stereoscopic.

An invention as set forth in Claim 20 resides in a stereoscopic video image pick-up and display system as defined in any of Claims 1 through 17 which is adapted to a terminal of car navigation system.

In accordance with the present invention, the display of car navigation system can be made stereoscopic.

An invention as set forth in Claim 21 resides in a stereoscopic video image pick-up and display system as defined in any of Claims 17 through 20 in which said video image information and CP information is communicated between said terminal devices.

In accordance with the present invention, stereoscopic video image information can be communicated between terminal devices, so that the same video image information can be shared.

An invention as set forth in Claim 22 resides in a stereoscopic video image pick-up and display system as defined in any of Claims 1 through 21 in which said medium is a communication medium.

In accordance with the present invention, a stereoscopic video image can be displayed even if both the stereoscopic video image pick-up device and stereoscopic video image display device are in the same position, and even if both devices are remote. The communication medium may include wireless communication, wired communication and optical communication.

An invention as set forth in Claim 23 resides in a stereoscopic video image pick-up and display system as defined in any of Claims 1 through 21 in which said medium is a communication medium.

In accordance with the present invention, stereoscopic video image information which is picked-up by the stereoscopic video image pick-up device can be stored and reproduced by the stereoscopic video image display device. The communication medium may include wireless communication, wired communication and optical communication.

What is claimed is:

1. A stereoscopic video image pick-up and display system comprising:
    a stereoscopic video image pick-up device including two video image pick-up means for outputting video information from said pick-up means;
    a stereoscopic video image display device for displaying different video images for the eyes of a viewer; and
    a medium for transmitting video image information from said stereoscopic video image pick-up device to said stereoscopic video image display device,
    in which said stereoscopic video image pick-up device includes cross-point measuring means for measuring CP information on the cross-point (CP) of optical axes of said pick-up means and outputs information including the CP information and video image information to said medium; and
    in which said stereoscopic video image display device includes offset presetting means for offsetting and displaying said different video images based upon said video image information, said cross-point information and information on the size of the image which is displayed by said stereoscopic video image display device.

2. A stereoscopic video image display system as defined in claim 1 wherein said stereoscopic video image display device includes viewer's position information measuring means for measuring information on the position of a viewer relative to a display screen, and further includes offset presetting means for offsetting and displaying said different video images based upon said video image information, said cross-point information, information on the size of the image which is displayed by said stereoscopic video image display device and the information on the position of the viewer.

3. A stereoscopic video image pick-up and display system as defined in claim 2 in which a viewer's position detecting means is disposed integrally with the main body of said stereoscopic video image pick-up and display system.

4. A stereoscopic video image pick-up and display system as defined in claim 3 in which a viewer's position detecting means includes an ultrasonic wave transmitter and ultrasonic wave receiver.

5. A stereoscopic video image pick-up and display system as defined in claim 3 in which a viewer's position detecting means detects the position based upon the picked-up image of the viewer.

6. A stereoscopic video image pick-up and display system as defined in claim 2 in which a viewer's position detecting means is disposed in a position remote from the main body of said stereoscopic video image pick-up and display system.

7. A stereoscopic video image pick-up and display system as defined in claim 1 in which said cross-point measuring means calculates the cross-point position based upon the angle of the intersection of the optical axes in said two pick-up means.

8. A stereoscopic video image pick-up and display system as defined in claim 1 in which said cross-point measuring means calculates the cross-point based upon the position of picking-up of an object in said two pick-up means which are disposed in a parallel relationship.

9. A stereoscopic video image pick-up and display system as defined in claim 1 in which said stereoscopic video image pick-up device is adapted to feed out information on the depth of an area, the image of which is picked-up in a depth direction and
    said stereoscopic video image display device includes offset presetting means for offsetting and displaying said different video images based upon said video image information, said cross-point information, information on the size of the image which is displayed by said stereoscopic video image display device and the information on the position of the viewer.

10. A stereoscopic video image pick-up and display system as defined in claim 1 in which said offset presetting means presets the offset of the right-eye and left-eye video images based upon the information input to a input means for adjusting the stereoscopic feeling of the image which is displayed by a display means.

11. A stereoscopic video image pick-up and display system as defined in claim 1 in which said system includes a memory for the left-eye video image for storing a left-eye video image and a memory for the right-eye video image for storing a right-eye video image,
    said offset presetting means includes timing control means for controlling the timing of the read-out of video image data from a frame memory for left-eye video image and/or a frame memory for right-eye video image; and
    said timing control means presets the offset of said left-eye video image and right-eye video image by advancing or delaying the timing of the read-out of the video image data from one of said frame memories for left-eye and right-eye video images relative to the timing of the read-out of the video image data from the other of said from memories for the left-eye and right-eye video images.

12. A stereoscopic video image pick-up and display system as defined in claim 1 in which said system comprises a stereoscopic video image frame memory for storing the stereoscopic video image therein, and signal switching means for switching between left-eye video image data read-out from said frame memory for the left-eye video image and right-eye video image read-out from said frame memory for said right-eye video image to input the data to said frame memory for the stereoscopic video image.

13. A stereoscopic video image pick-up and display system as defined in claim 1 in which the offset of said left-eye and right-eye video images is preset by advancing or delaying the horizontal phase of said left-eye and right-eye images.

14. A stereoscopic video image pick-up and display system as defined in claim 1 in which an area of one or both of left-eye and right-eye video image in the vicinity of its lateral edge is enlarged in a horizontal and vertical directions so that it fills a blank area which is caused by the presetting of the offset of said left-eye and right-eye video images.

15. A stereoscopic video image pick-up and display system as defined in claim 1 in which a display means includes video image display means for displaying a video image with transmitted light and a light source device, said light source device comprising an LED array in which white LEDs or RGB LEDs are integrally arrayed, said offset presetting means including LED control means for controlling the lighting of said white LEDs or RGB LEDs of said LED array based upon said offset.

16. A stereoscopic video image pick-up and display system as defined in claim 15 in which said LED control means of said offset presetting means controls the lighting of said white LEDs or RGB LEDs based upon a viewer's position information so that the video image which is viewed by a viewer is maintained.

17. A stereoscopic video image pick-up and display system as defined in claim 15 in which each LED array which is provided at upper and lower areas of said light source device forms a right-eye video image display unit and left-eye video image display unit.

18. A stereoscopic video image pick-up and display system as defined in claim 17 in which said video image information and CP information is communicated between terminal devices.

19. A stereoscopic video image pick-up and display system as defined in claim 1 which is adapted to a display system of portable digital assistant (PDA).

20. A stereoscopic video image pick-up and display system as defined in claim 1 which is adapted to a display system of mobile communication terminal.

21. A stereoscopic video image pick-up and display system as defined in claim 1 which is adapted to a terminal of car navigation system.

22. A stereoscopic video image pick-up and display system as defined in claim 1 in which said medium is a communication medium.

* * * * *